US010580370B2

(12) United States Patent
Yata et al.

(10) Patent No.: US 10,580,370 B2
(45) Date of Patent: Mar. 3, 2020

(54) DISPLAY DEVICE

(71) Applicant: Japan Display Inc., Tokyo (JP)

(72) Inventors: Tatsuya Yata, Tokyo (JP); Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/163,994

(22) Filed: Oct. 18, 2018

(65) Prior Publication Data

US 2019/0122620 A1   Apr. 25, 2019

(30) Foreign Application Priority Data

Oct. 23, 2017  (JP) .................. 2017-204588

(51) Int. Cl.
*G09G 3/36* (2006.01)
*G02F 1/1335* (2006.01)

(52) U.S. Cl.
CPC ..... *G09G 3/3607* (2013.01); *G02F 1/133512* (2013.01); *G02F 1/133514* (2013.01); *G09G 3/3637* (2013.01); *G09G 3/3648* (2013.01); *G09G 2300/0452* (2013.01); *G09G 2310/0264* (2013.01); *G09G 2320/0242* (2013.01); *G09G 2320/0271* (2013.01)

(58) Field of Classification Search
CPC .. G09G 3/3607; G09G 3/3637; G09G 3/3648; G09G 3/2003; G09G 3/2074; G02F 1/133512; G02F 1/133514; G02F 1/134309
See application file for complete search history.

(56) References Cited

U.S. PATENT DOCUMENTS 5,469,281 A * 11/1995 Katakura ............. G09G 3/3637
                                                           345/89
6,911,784 B2 * 6/2005 Sasaki ................. G09G 3/3611
                                                       315/169.4

(Continued)

FOREIGN PATENT DOCUMENTS

JP         4364281 B2    8/2009
JP    2010-097176 A    4/2010

(Continued)

*Primary Examiner* — Sardis F Azongha
(74) *Attorney, Agent, or Firm* — Michael Best & Friedrich LLP

(57) ABSTRACT

According to an aspect, a display device includes first to fourth sub-pixels. The first to fourth sub-pixels are each divided into N (N≥2) sub-divided pixels having different areas and can perform N-bit gradation display. Gradation display for a mixed color combining two types out of the first to fourth sub-pixels includes: the N-bit gradation display including $2^N$-step gradation; and halftone gradation display. In first and second gradation display, an area ratio between the sub-divided pixels driven and those not driven in one of the two types is equal to that in the other of the two types. In the second gradation display, a total area ratio of the sub-divided pixels driven to those not driven is greater than that in the first gradation display. In the halftone gradation display, an area ratio between the sub-divided pixels driven and those not driven is different between the two types.

15 Claims, 15 Drawing Sheets

(56) References Cited

U.S. PATENT DOCUMENTS

| | | | | |
|---|---|---|---|---|
| 2002/0167477 | A1* | 11/2002 | Tsutsui | G09G 3/3648 |
| | | | | 345/89 |
| 2005/0068279 | A1* | 3/2005 | Hirota | G06F 1/3203 |
| | | | | 345/87 |
| 2005/0185003 | A1* | 8/2005 | Dedene | G02F 1/133514 |
| | | | | 345/694 |
| 2009/0135213 | A1 | 5/2009 | Tomizawa et al. | |
| 2012/0229529 | A1 | 9/2012 | Tomizawa et al. | |
| 2013/0063499 | A1* | 3/2013 | Tanaka | G09G 3/3648 |
| | | | | 345/690 |
| 2013/0229444 | A1* | 9/2013 | Teranishi | G09G 5/10 |
| | | | | 345/690 |
| 2013/0258258 | A1 | 10/2013 | Nakamura et al. | |
| 2014/0285761 | A1* | 9/2014 | Tamaki | G09G 3/2074 |
| | | | | 349/144 |
| 2017/0069279 | A1* | 3/2017 | Hayashi | G09G 3/3614 |
| 2017/0153513 | A1* | 6/2017 | Tamaki | G02F 1/134309 |

FOREIGN PATENT DOCUMENTS

| | | |
|---|---|---|
| JP | 5427246 B2 | 12/2013 |
| WO | 2012/077565 A1 | 6/2012 |

* cited by examiner

FIG.4

| REPRODUCED COLOR | WHITE | RED | GREEN | BLUE | YELLOW | CYAN | MAGENTA |
|---|---|---|---|---|---|---|---|
| INPUT (R, G, B) | (n, n, n) | (n, 0, 0) | (0, n, 0) | (0, 0, n) | (m, m, 0) | (0, m, m) | (m, 0, m) |
| OUTPUT (R1, RG1, BG1, B1) | (n1, n2, n3, n4) | (n, 0, 0, 0) | (0, n5, n6, 0) | (0, 0, 0, n) | (m1, m2, m3, 0) | (0, m4, m5, m6) | (m7, 0, 0, m8) |

DISPLAY DEVICE

CROSS-REFERENCE TO RELATED APPLICATIONS

This application claims priority from Japanese Application No. 2017-204588, filed on Oct. 23, 2017, the contents of which are incorporated by reference herein in its entirety.

BACKGROUND

1. Technical Field

The present disclosure relates to a display device.

2. Description of the Related Art

As disclosed in Japanese Patent Application Laid-open Publication No. 2010-97176, a so-called reflective display device that reflects external light to display an image has been known.

A known reflective display device employs so-called area coverage modulation to provide a plurality of gradation expressions through a combination of a plurality of pixels having different areas. However, the conventional area coverage modulation only achieves gradation performance according to the number of pixels constituting one set of pixels used for the area coverage modulation. Therefore, a display device that can achieve even higher gradation performance has been required.

For the foregoing reasons, there is a need for a display device that can achieve higher gradation performance.

SUMMARY

According to an aspect of the present disclosure, a display device includes: a first sub-pixel; a second sub-pixel; a third sub-pixel; and a fourth sub-pixel. Each of the first sub-pixel, the second sub-pixel, the third sub-pixel, and the fourth sub-pixel is divided into N sub-divided pixels having different areas and is capable of N-bit gradation display through a combination of the N sub-divided pixels to be driven, where N is a natural number of 2 or greater. Gradation display for a mixed color that combines two types of sub-pixels out of the first sub-pixel, the second sub-pixel, the third sub-pixel, and the fourth sub-pixel includes the N-bit gradation display and halftone gradation display. The N-bit gradation includes $2^N$-step gradation. The halftone gradation display is gradation display between first gradation display and second gradation display. In the first gradation display, an area ratio between the sub-divided pixels to be driven and the sub-divided pixels not to be driven in one of the two types of the sub-pixels is equal to an area ratio between the sub-divided pixels to be driven and the sub-divided pixels not to be driven in the other of the two types of the sub-pixels. In the second gradation display, an area ratio between the sub-divided pixels to be driven and the sub-divided pixels not to be driven in one of the two types of the sub-pixels is equal to an area ratio between the sub-divided pixels to be driven and the sub-divided pixels not to be driven in the other of the two types of the sub-pixels, and a total area ratio of the sub-divided pixels to be driven to the sub-divided pixels not to be driven is greater than that in the first gradation display. In the halftone gradation display, an area ratio between the sub-divided pixels to be driven and the sub-divided pixels not to be driven is different between the two types of the sub-pixels.

BRIEF DESCRIPTION OF THE DRAWINGS

FIG. 4 is a chart indicating relations among reproduced colors by a single pixel, R, G, and B gradation values applied as image signals, and the sub-pixels used for the output;

DETAILED DESCRIPTION

Figure 1:
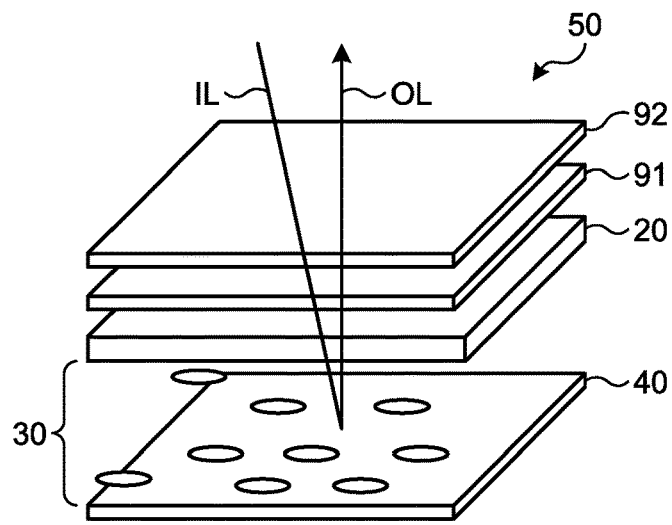
FIG. 1 is a perspective view schematically illustrating a main configuration of a single sub-divided pixel.

Modes (embodiments) for carrying out the present disclosure will be described below in detail with reference to the drawings. The disclosure is given by way of example only, and various changes made without departing from the spirit of the disclosure and easily conceivable by those skilled in the art naturally fall within the scope of the present disclosure. The drawings may possibly illustrate the width, the thickness, the shape, and other elements of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and overlapping explanation thereof will be appropriately omitted. In this disclosure, when an element A is described as being "on" another element B, the element A can be directly on the other element B, or there can be one or more elements between the element A and the other element B.

FIG. 1 is a perspective view schematically illustrating a main configuration of a single sub-divided pixel 50. The sub-divided pixel 50 includes a color filter 20, a reflective electrode 40, and a polarizing plate 91. The color filter 20 is a member that has light transmissivity.

A liquid crystal layer 30 is disposed between the color filter 20 and the reflective electrode 40. The liquid crystal layer 30 includes a multitude of liquid crystal molecules. The orientation of each liquid crystal molecule varies according to an electric field applied thereto by the reflective electrode 40, for example. Accordingly, a relation between light (light OL) reflected by the reflective electrode 40 and the polarizing plate 91 varies according to the orientation of the liquid crystal molecule. When the orientation of the liquid crystal molecule is such that the light OL is polarized so as to pass through the polarizing plate 91, the sub-divided pixel 50 is brought into a display state. When the orientation of the liquid crystal molecule is such that the light OL is polarized so as not to pass through the polarizing plate 91, the sub-divided pixel 50 is brought into a non-display state. The sub-divided pixel 50 in the display state causes the reflective electrode 40 to reflect external light IL, thereby emitting the light OL. The sub-divided pixel 50 in the non-display state does not emit the light OL. Specifically, the sub-divided pixel 50 switches between reflection and non-reflection of the external light IL depending on its state (whether in the display state or in the non-display state). Either one of the display state and the non-display state represents a state in which the sub-divided pixel 50 is driven and the other one of the display state and the non-display state represents a state in which the sub-divided pixel 50 is not driven. For example, a scattering layer 92 for adjusting a scattering direction or the like of the light OL from the reflective electrode side may be disposed on one side of the polarizing plate 91, the one side being opposite to the other side on which the color filter 20 is disposed. The scattering layer 92 scatters the light OL reflected by the reflective electrode 40.

Figure 2:
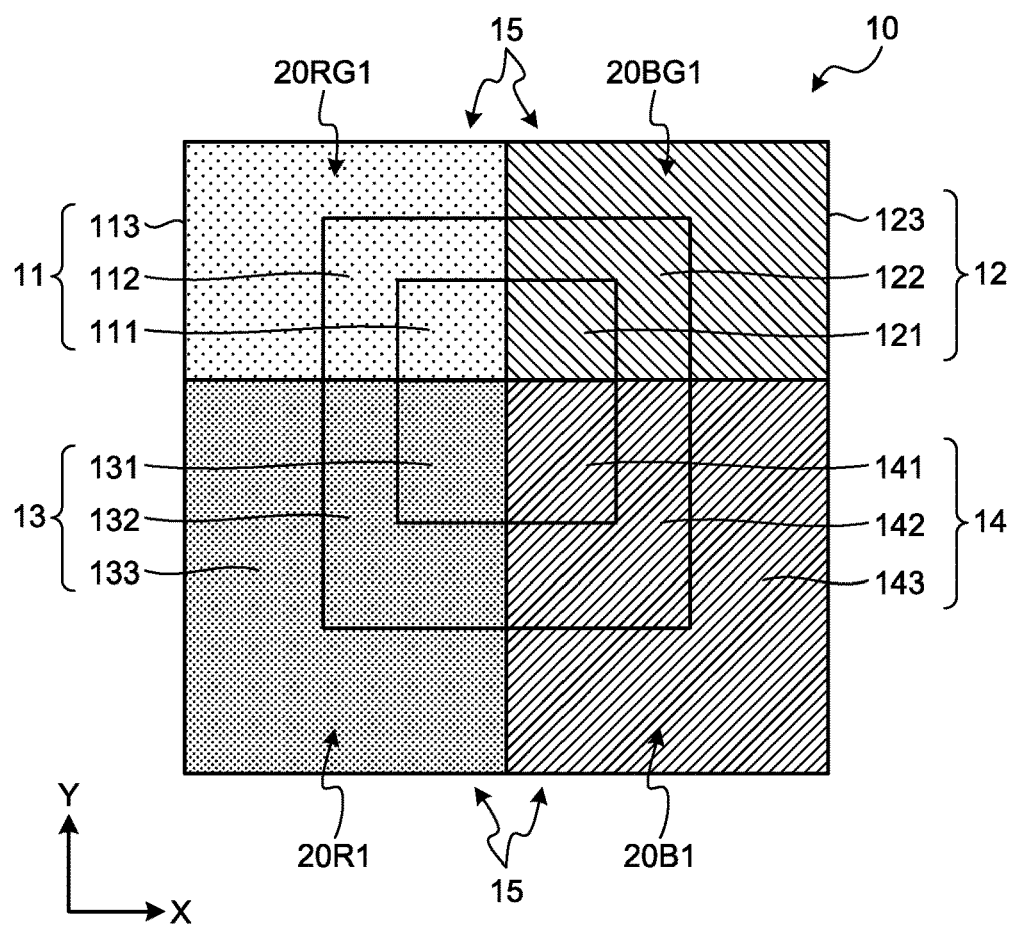
FIG. 2 is a diagram illustrating exemplary shapes and sizes of sub-pixels included in a single pixel, an exemplary positional relation among the sub-pixels, and exemplary color filters of the respective sub-pixels.

FIG. 2 is a diagram illustrating exemplary shapes and sizes of sub-pixels 15 included in a single pixel 10, an exemplary positional relation among the sub-pixels, and exemplary color filters of the respective sub-pixels 15. The pixel 10 includes a first sub-pixel 11, a second sub-pixel 12, a third sub-pixel 13, and a fourth sub-pixel 14. The first sub-pixel 11, the second sub-pixel 12, the third sub-pixel 13, and the fourth sub-pixel 14 each include a color filter 20. The color filters 20 of the respective sub-pixels have different peaks of spectra of light transmitted therethrough. The peaks of the spectra of light transmitted through the respective color filters 20 will be describe later. The term "sub-pixel 15" is used when the first sub-pixel 11, the second sub-pixel 12, the third sub-pixel 13, and the fourth sub-pixel 14 are not distinguished from one another by the respective color filters 20. One pixel 10 includes a plurality of sub-pixels 15.

One sub-pixel 15 includes a plurality of sub-divided pixels 50. For example, the first sub-pixel 11 includes sub-divided pixels 50 functioning as three regions having different areas including a first sub-divided pixel 111, a second sub-divided pixel 112, and a third sub-divided pixel 113. The ratio of the areas of the first sub-divided pixel 111, the second sub-divided pixel 112, and the third sub-divided pixel 113 is 1 to 2 to 4 ($=2^0$ to $2^1$ to $2^2$), for example. The first sub-divided pixel 111, the second sub-divided pixel 112, and the third sub-divided pixel 113 each have a configuration similar to the configuration of the sub-divided pixel 50 described above. Specifically, the first sub-divided pixel 111, the second sub-divided pixel 112, and the third sub-divided pixel 113 are each configured such that its state (the display state or the non-display state) can be individually controlled. Changing a combination of states (the display state or the non-display state) of the first sub-divided pixel 111, the second sub-divided pixel 112, and the third sub-divided pixel 113 allows the area of the display state, in which the light OL is emitted, to be changed within the first sub-pixel 11. The first sub-pixel 11 has gradation performance of three bits (eight-step gradation) or more through the combinations of the states (the display state or the non-display state) of the first sub-divided pixel 111, the second sub-divided pixel 112, and the third sub-divided pixel 113.

Figure 5:
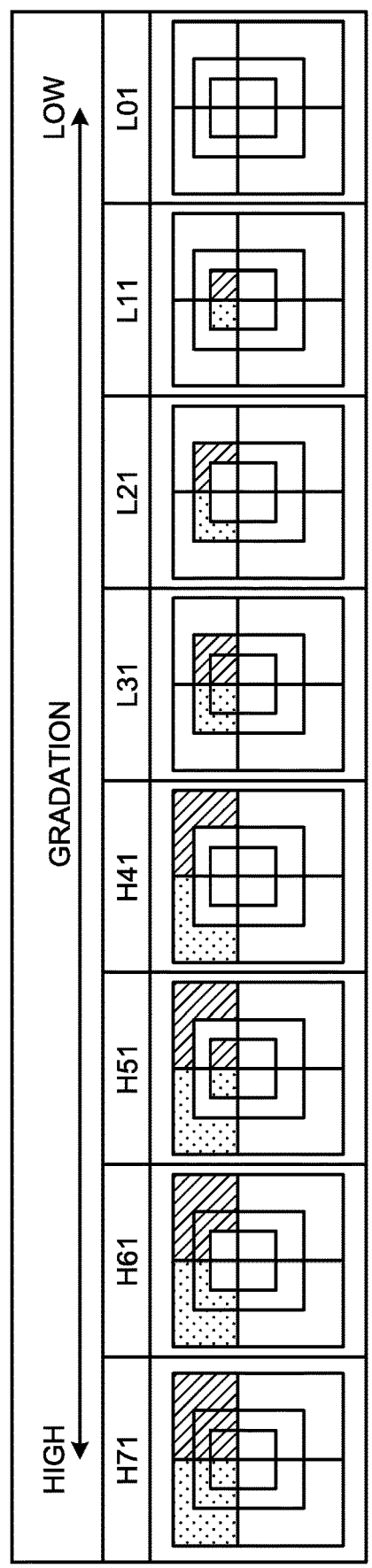
FIG. 5 is a diagram illustrating exemplary patterns of combinations of a plurality of sub-divided pixels in a display state and a non-display state used in N-bit gradation display.

For example, area coverage modulation of an eight-step gradation performed through the combination patterns of whether the light OL passes through the polarizing plate 91 according to the states (the display state or the non-display state) of the first sub-divided pixel 111, the second sub-divided pixel 112, and the third sub-divided pixel 113 is expressed as "0 to 0 to 0", "1 to 0 to 0", "0 to 1 to 0", "1 to 1 to 0", "0 to 0 to 1", "1 to 0 to 1", "0 to 1 to 1", and "1 to 1 to 1" in ascending order of an output gradation, where 1 denotes that the specific sub-divided pixel transmits light and 0 denotes that the specific sub-divided pixel does not transmit light (see FIG. 5). The pattern (e.g., peak) of spectra of light to be transmitted through the color filters 20 of the sub-divided pixels 50 included in a single sub-pixel 15 is uniform.

The second sub-pixel 12 includes a plurality of sub-divided pixels 50 such as a first sub-divided pixel 121, a second sub-divided pixel 122, and a third sub-divided pixel 123. The third sub-pixel 13 includes a plurality of sub-divided pixels 50 such as a first sub-divided pixel 131, a second sub-divided pixel 132, and a third sub-divided pixel 133. The fourth sub-pixel 14 includes a plurality of sub-divided pixels 50 such as a first sub-divided pixel 141, a second sub-divided pixel 142, and a third sub-divided pixel 143. The second sub-pixel 12, the third sub-pixel 13, and the fourth sub-pixel 14 each have gradation performance of three bits (eight-step gradation) or more, similarly to the first sub-pixel 11.

As described above, the sub-pixels 15 illustrated in FIG. 2 are each divided into a plurality of sub-divided pixels 50 having different areas. Gradation display for each of the sub-pixels 15 can be performed through the combinations of the states (the display state or the non-display state) of the sub-divided pixels 50. The number of sub-divided pixels 50 included in a single sub-pixel 15 may be two, or four or more. Gradation performance of a single sub-pixel 15 in the area coverage modulation is equal to or more than the number of bits (N bits) corresponding to the number (N) of the sub-divided pixels 50, where N is a natural number of 2 or greater. Assuming that the area of the smallest sub-divided pixel 50 is 1, the q-th (q-th bit) sub-divided pixel 50 from the smallest sub-divided pixel 50 has an area of $2^{(q-1)}$.

A black matrix 23 (see FIG. 9) is disposed between the sub-pixels 15. For example, the black matrix 23 is disposed among a plurality of color filters 20. For example, the black matrix 23 may be a black filter or may be configured such that the color filters of two adjacent sub-pixels are superimposed on top of one another to reduce a transmission factor in the overlapping part. The black matrix 23 may be omitted. A ratio of area coverage modulation by the sub-divided pixels 50 (e.g., 1 to 2 to 4) corresponds to an aperture ratio in a plan view. Thus, in a configuration including the black matrix 23, the ratio of area coverage modulation corresponds to a ratio of openings on which the black matrix 23 is not disposed. In a configuration without black matrix 23, the ratio of area coverage modulation corresponds to an area ratio of the reflective electrodes 40 included in the respective sub-divided pixels 50. Specific shapes of the reflective electrodes 40 vary depending on specific shapes of the sub-divided pixels 50. For example, in FIG. 2, the reflective electrodes 40 having a rectangular shape, an L-shape, and an L-shape are provided from the center of the pixel 10 for the respective sub-divided pixels 50.

The color filter 20 has a predetermined peak of a spectrum of the light OL to be transmitted out of the external light IL. Specifically, the peak of the spectrum of the light OL to be transmitted through the color filter 20 falls on any one of the spectrum of reddish green (e.g., first red green RG1), the spectrum of bluish green (e.g., first blue green BG1), the spectrum of red (e.g., red R1), and the spectrum of blue (e.g., blue B1). The reflective electrode 40 reflects the light OL that is transmitted through the color filter 20. The light OL is a result of reflection of the external light IL, having passed through the color filter 20, by the reflective electrode 40.

Figure 3:
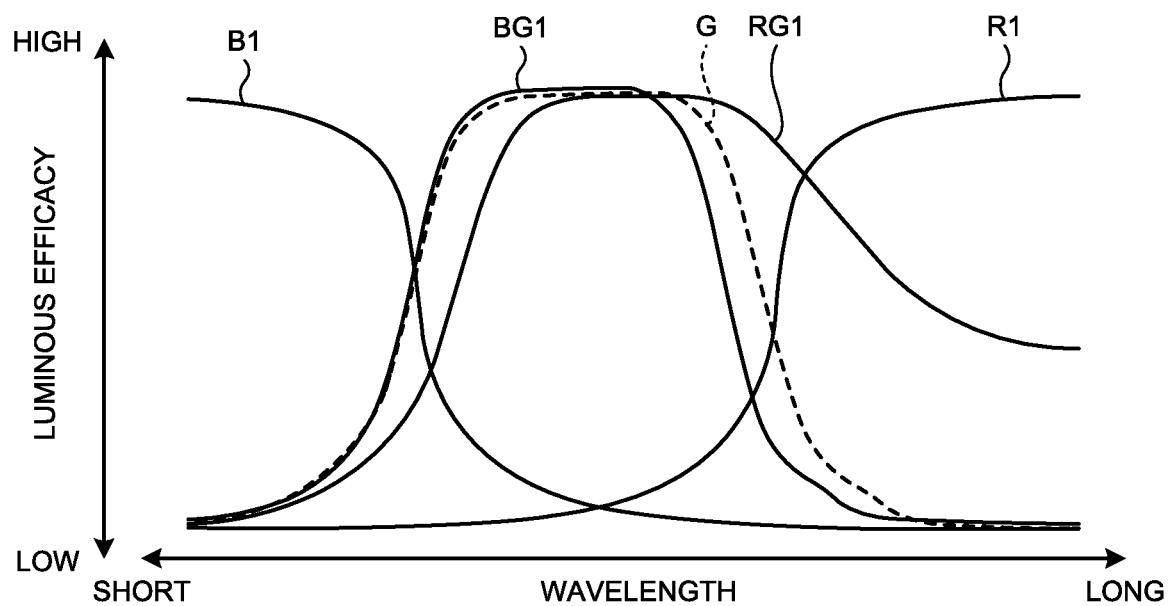
FIG. 3 is a graph indicating exemplary spectra of red, reddish green, green, bluish green, and blue.

FIG. 3 is a graph indicating exemplary spectra of red, reddish green, green, bluish green, and blue. As exemplified in FIG. 3, the peak of the spectrum of the first red green RG1 and the peak of the spectrum of the first blue green BG1 each have a portion overlapping with the peak of the spectrum of light viewed as green G. The spectrum of the first red green RG1 is closer to the spectrum of the red R1 (on the long wavelength side) than the spectrum of the first blue green BG1 and the spectrum of the green G are. The spectrum of the first blue green BG1 is closer to the spectrum of the blue B1 (on the short wavelength side) than the spectrum of the first red green RG1 and the spectrum of the green G are.

The first sub-pixel 11 includes a first color filter 20RG1. The second sub-pixel 12 includes a second color filter 20BG1. The third sub-pixel 13 includes a third color filter 20R1. The fourth sub-pixel 14 includes a fourth color filter 20B1. The peak of the spectrum of the light transmitted through the first color filter 20RG1 falls on the spectrum of the reddish green (first red green RG1). The peak of the spectrum of the light transmitted through the second color filter 20BG1 falls on the spectrum of the bluish green (first blue green BG1). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). The pixel has a square shape in a plan view, and includes the sub-pixels in the respective four colors in respective regions obtained by sectioning the square pixel region. The sub-pixels each have a square or rectangular shape in a plan view (hereinafter referred to as a rectangle). The four rectangles are combined to form the square pixel. A light shielding layer such as a black matrix may be disposed in regions between the sub-pixels and an outer edge of the pixel, but this light shielding layer occupies only a small area of the pixel. Thus, when describing the shapes or combination of the sub-pixels or the shape of the pixel, such a light shielding layer may be substantially disregarded as a linear object constituting an outer edge of the pixel or the sub-pixel.

In the following description, the term "color filter 20" will be used to describe the color filter 20 when the peak of the spectrum of the light OL to be transmitted is not differentiated. When the peak of the spectrum of the light OL to be transmitted is differentiated, the color filter 20 will be described as, for example, the first color filter 20RG1, the second color filter 20BG1, the third color filter 20R1, or the fourth color filter 20B1, where appropriate. The light OL that has been transmitted through the color filter 20 is viewed as light in the color corresponding to the peak of the spectrum of the light to be transmitted through the color filter 20.

The area of the third sub-pixel 13 and the area of the fourth sub-pixel 14 are each greater than the area of the first sub-pixel 11 and the area of the second sub-pixel 12. The sum of the areas of the first sub-pixel 11 and the second sub-pixel 12 is equal to or greater than the area of the third sub-pixel 13 and is equal to or greater than the area of the fourth sub-pixel 14. The area of the third sub-pixel 13 is identical to the area of the fourth sub-pixel 14. The area of the first sub-pixel 11 is identical to the area of the second sub-pixel 12. When an area ratio of the first sub-pixel 11, the second sub-pixel 12, the third sub-pixel 13, and the fourth sub-pixel 14 is expressed as A to B to C to D, the following expressions hold: $0.65 \le A=B<1.0$, and $1.0 \le C=D \le 1.35$. FIG. 2 exemplifies a case in which the expression of A to B to C to D=0.744 to 0.744 to 1.256 to 1.256 holds. In this case, the sum of the areas of the first sub-pixel 11 and the second sub-pixel 12 is equal to or greater than the area of the third sub-pixel 13 and is equal to or greater than the area of the fourth sub-pixel 14.

FIG. 4 is a chart indicating relations among reproduced colors by a single pixel 10, R, G, and B gradation values applied as image signals, and the sub-pixels 15 used for the output. When the input gradation values of R, G, and B are expressed as (R, G, B)=(n, n, n), the reproduced color is white and the first sub-pixel 11, the second sub-pixel 12, the third sub-pixel 13, and the fourth sub-pixel 14 are used for the output. When the input gradation values of R, G, and B are expressed as (R, G, B)=(n, 0, 0), the reproduced color is red and the third sub-pixel 13 is used for the output. When the input gradation values of R, G, and B are expressed as (R, G, B)=(0, n, 0), the reproduced color is green and the first sub-pixel 11 and the second sub-pixel 12 are used for the output. When the input gradation values of R, G, and B are expressed as (R, G, B)=(0, 0, n), the reproduced color is blue and the fourth sub-pixel 14 is used for the output. When the input gradation values of R, G, and B are expressed as (R, G, B)=(m, m, 0), the reproduced color is yellow and the first sub-pixel 11, the second sub-pixel 12, and the third sub-pixel 13 are used for the output. When the input gradation values of R, G, and B are expressed as (R, G, B)=(0, m, m), the reproduced color is cyan and the first sub-pixel 11, the second sub-pixel 12, and the fourth sub-pixel 14 are used for the output. When the input gradation values of R, G, and B are expressed as (R, G, B)=(m, 0, m), the reproduced color is magenta and the third sub-pixel 13 and the fourth sub-pixel 14 are used for the output. In this manner, the display device 1 (e.g., see FIG. 8) in the embodiment reproduces yellow through the combination of the first sub-pixel 11, the second sub-pixel 12, and the third sub-pixel 13. The display device 1 in the embodiment reproduces green through the combination of the first sub-pixel 11 and the second sub-pixel 12. The display device 1 in the embodiment reproduces cyan through the combination of the first sub-pixel 11, the second sub-pixel 12, and the fourth sub-pixel 14. The display device 1 in the embodiment reproduces magenta through the combination of the third sub-pixel 13 and the fourth sub-pixel 14. The display device 1 in the embodiment reproduces red using the third sub-pixel 13. The display device 1 in the embodiment reproduces blue using the fourth sub-pixel 14.

The display device 1 has a plurality of patterns of combinations of the states (the display state or the non-display state) of the sub-divided pixels 50 corresponding to the input signal. The following describes patterns of area coverage modulation based on the pixel 10 illustrated in FIG. 2.

FIG. 5 is a diagram illustrating exemplary patterns of combinations of the sub-divided pixels 50 in the display state and the non-display state used in the N-bit gradation display. FIG. 5 exemplifies a case in which the first sub-pixel 11 and the second sub-pixel 12 are used to reproduce green. When N=3, patterns used for the N-bit gradation display (three bits=eight gradation display) in reproducing green are a total of eight patterns of a pattern L01, a pattern L11, a pattern L21, a pattern L31, a pattern H41, a pattern H51, a pattern H61, and a pattern H71.

In the pattern L01, all the sub-divided pixels 50 are in the non-display state. In the pattern L11, a first sub-divided pixel 111 and a first sub-divided pixel 121 are in the display state, while the other sub-divided pixels 50 are in the non-display state. In the pattern L21, a second sub-divided pixel 112 and a second sub-divided pixel 122 are in the display state, while the other sub-divided pixels 50 are in the non-display state. In the pattern L31, the first sub-divided pixel 111 and the second sub-divided pixel 112, and the first sub-divided pixel 121 and the second sub-divided pixel 122 are in the display state, while the other sub-divided pixels 50 are in the non-display state. In the pattern H41, a third sub-divided pixel 113 and a third sub-divided pixel 123 are in the display state, while the other sub-divided pixels 50 are in the non-display state. In the pattern H51, the first sub-divided pixel 111 and the third sub-divided pixel 113, and the first sub-divided pixel 121 and the third sub-divided pixel 123 are in the display state, while the other sub-divided pixels 50 are in the non-display state. In the pattern H61, the second sub-divided pixel 112 and the third sub-divided pixel 113, and the second sub-divided pixel 122 and the third sub-divided pixel 123 are in the display state, while the other sub-divided pixels 50 are in the non-display state. In the pattern H71, the first sub-divided pixel 111, the second sub-divided pixel 112, and the third sub-divided pixel 113, and the first sub-divided pixel 121, the second sub-divided pixel 122, and the third sub-divided pixel 123 are in the display state, while the other sub-divided pixels 50 are in the non-display state.

Assume that a "zero gradation" is the lowest gradation among the gradations reproduced through the gradation display using the sub-divided pixels 50, and a "$(2^N-1)$-step gradation" is the highest gradation out of the gradations reproduced through the gradation display using the sub-divided pixels 50. In this case, the eight gradation display with N=3 includes the zero gradation to a seven-step gradation. In the example illustrated in FIG. 5, the pattern L01 corresponds to the zero gradation; the pattern L11 corresponds to a one-step gradation; the pattern L21 corresponds to a two-step gradation; the pattern L31 corresponds to a three-step gradation; the pattern H41 corresponds to a four-step gradation; the pattern H51 corresponds to a five-step gradation; the pattern H61 corresponds to a six-step gradation; and the pattern H71 corresponds to the seven-step gradation.

The gradation display using the sub-divided pixels 50 is not limited to the N-bit gradation display, and may include halftone gradation display. The halftone gradation display is performed by a combination of whether each of the sub-divided pixels 50 reflects light, in which one or more of two different types of sub-pixels 15 correspond to a u-step gradation, and one or more of two different types of sub-pixels 15 correspond to a (u+1)-step gradation, where u satisfies the expression $0 \leq u \leq 2^N-2$.

Figure 6:
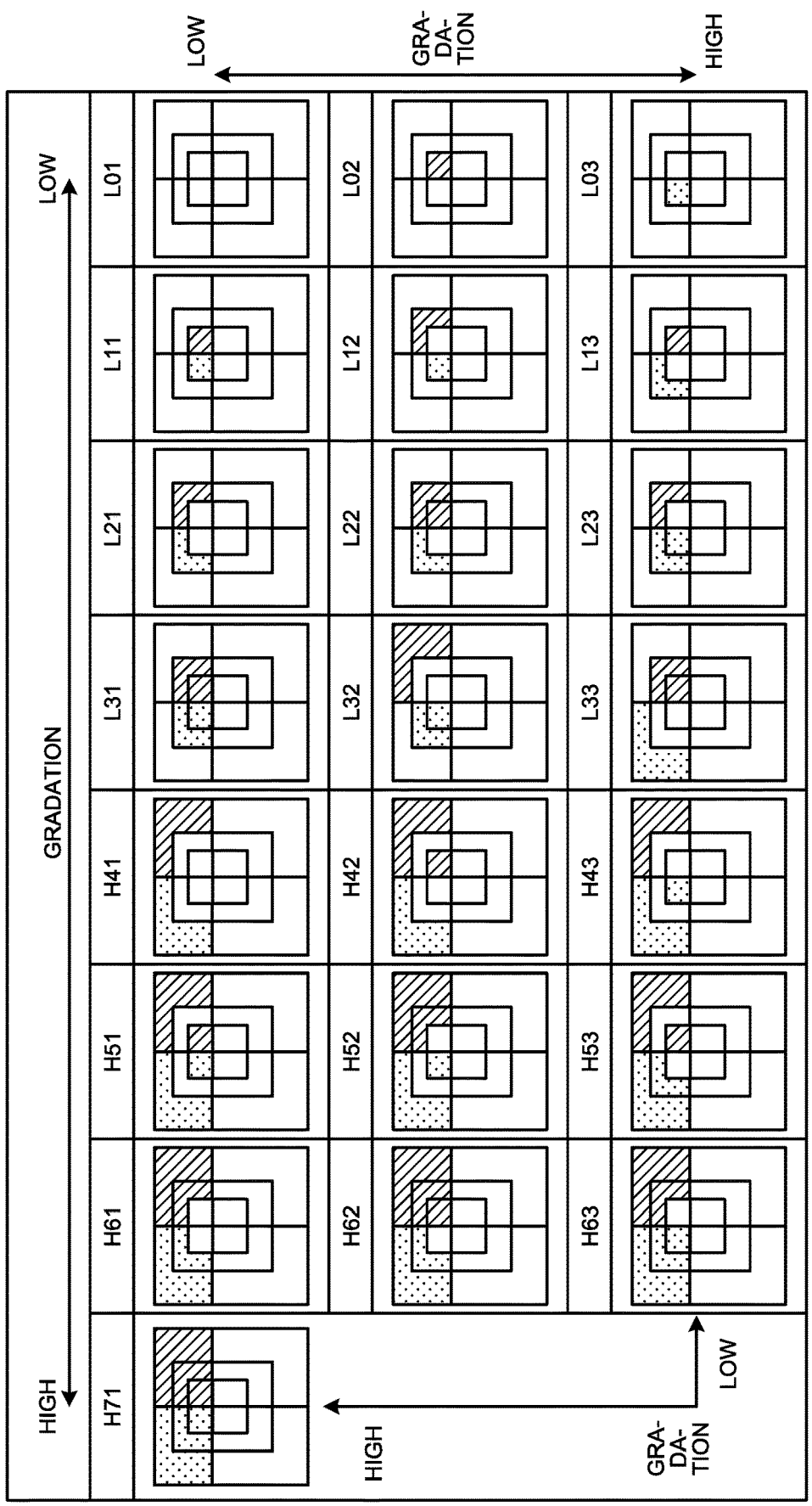
FIG. 6 is a diagram illustrating exemplary patterns of combinations of a plurality of sub-divided pixels in the display state and the non-display state including halftone gradation display.
Figure 7:
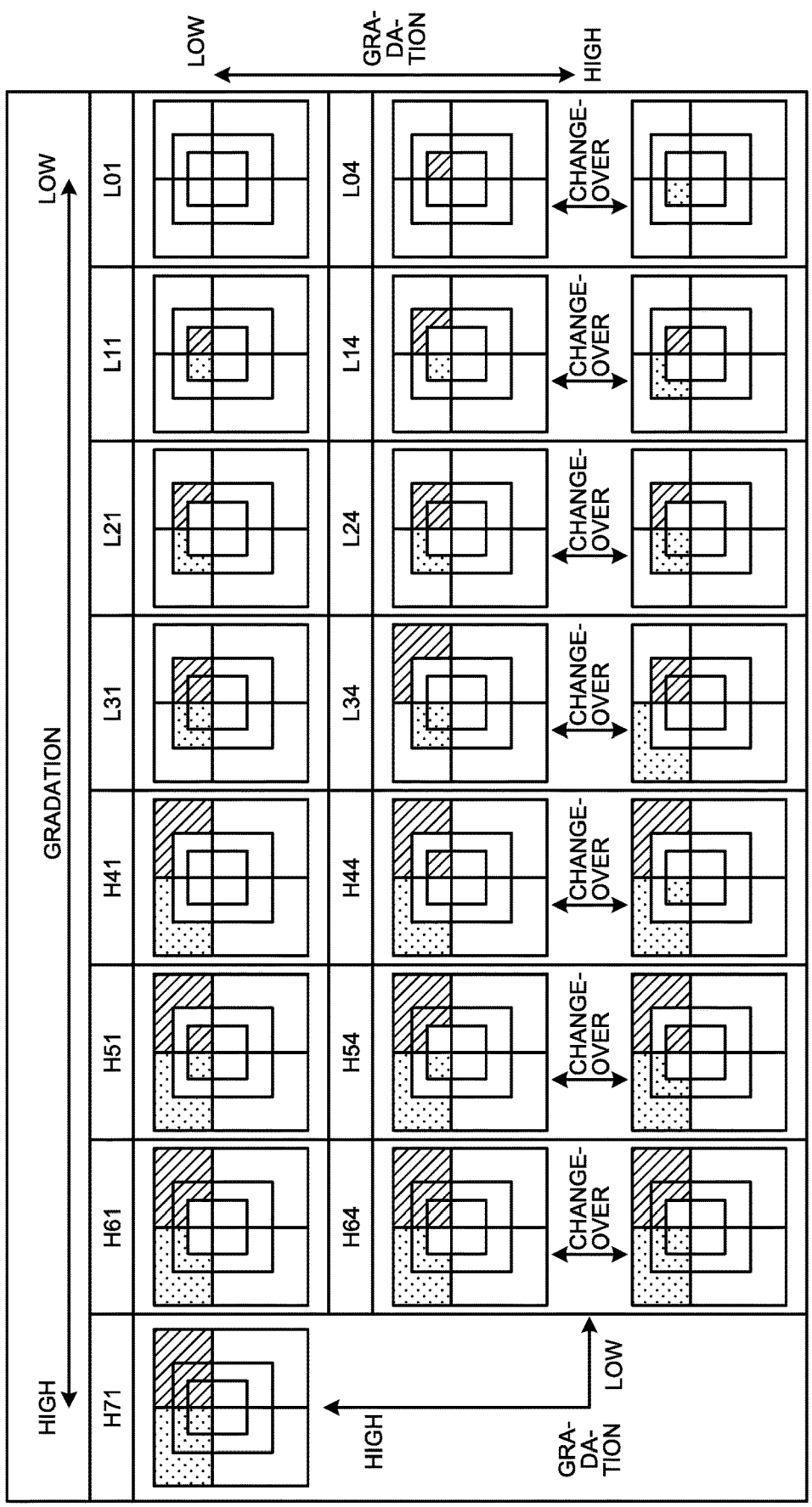
FIG. 7 is a diagram illustrating other exemplary patterns of combinations of a plurality of sub-divided pixels in the display state and the non-display state including halftone gradation display.

FIG. 6 is a diagram illustrating exemplary patterns of combinations of the sub-divided pixels 50 in the display state and the non-display state including the halftone gradation display. FIG. 6, and FIG. 7 to be described later, exemplify cases in which the first sub-pixel 11 and the second sub-pixel 12 are used. The patterns illustrated in FIG. 6 include, in addition to the patterns associated with the N-bit gradation display described with reference to FIG. 5, patterns associated with the halftone gradation display. The patterns associated with the N-bit gradation display are the pattern L01, the pattern L11, the pattern L21, the pattern L31, the pattern H41, the pattern H51, the pattern H61, and the pattern H71. The patterns associated with the halftone gradation display are the pattern L02, the pattern L03, the pattern L12, the pattern L13, the pattern L22, the pattern L23, the pattern L32, the pattern L33, the pattern H42, the pattern H43, the pattern H52, the pattern H53, the pattern H62, and the pattern H63.

Out of the patterns associated with the halftone gradation display, the pattern L02, the pattern L12, the pattern L22, the pattern L32, the pattern H42, the pattern H52, and the pattern H62 each correspond to a first combination. The first combination is a combination of whether each of the sub-divided pixels 50 reflects light, in which, out of the two different types of the sub-pixels 15, one or more of the sub-pixels 15 including a relatively bright color filter correspond to the u-step gradation and, out of the two different types of the sub-pixels 15, one or more of the sub-pixels 15 including a relatively dark color filter correspond to the (u+1)-step gradation.

For example, in the pattern L02, all sub-divided pixels 50 included in the first sub-pixel 11 are in the non-display state. Specifically, the state of the first sub-pixel 11 in the pattern L02 corresponds to the zero gradation of the N-bit gradation display described with reference to FIG. 5. In the pattern L02, out of the sub-divided pixels 50 included in the second sub-pixel 12, the first sub-divided pixel 121 is in the display state, while the second sub-divided pixel 122 and the third sub-divided pixel 123 are in the non-display state. Specifically, the state of the second sub-pixel 12 in the pattern L02 corresponds to the one-step gradation of the N-bit gradation display described with reference to FIG. 5. The second color filter 20BG1 (first blue green BG1) disposed in the first sub-divided pixel 121 that is set in the display state has a color darker than a color (first red green RG1) of the first color filter 20RG1. Thus, the pattern L02 is the first combination to which u=0 has been applied.

The pattern L12 is the first combination to which u=1 is applied. The pattern L22 is the first combination to which u=2 is applied. The pattern L32 is the first combination to which u=3 is applied. The pattern H42 is the first combination to which u=4 is applied. The pattern H52 is the first combination to which u=5 is applied. The pattern H62 is the first combination to which u=6 is applied.

Out of the patterns associated with the halftone gradation display, the pattern L03, the pattern L13, the pattern L23, the pattern L33, the pattern H43, the pattern H53, and the pattern H63 each correspond to a second combination. The second combination is a combination of whether each of the sub-divided pixels 50 reflects light, in which, out of the two different types of the sub-pixels 15, one or more of the sub-pixels 15 including a relatively dark color filter correspond to the u-step gradation and, out of the two different types of the sub-pixels 15, one or more of the sub-pixels 15 including a relatively bright color filter correspond to the (u+1)-step gradation.

For example, in the pattern L03, all sub-divided pixels 50 included in the second sub-pixel 12 are in the non-display state. Specifically, the state of the second sub-pixel 12 in the pattern L03 corresponds to the zero gradation of the N-bit gradation display described with reference to FIG. 5. In the pattern L03, out of the sub-divided pixels 50 included in the first sub-pixel 11, the first sub-divided pixel 111 is in the display state, while the second sub-divided pixel 112 and the third sub-divided pixel 113 are in the non-display state. Specifically, the state of the first sub-pixel 11 in the pattern L03 corresponds to the one-step gradation of the N-bit gradation display described with reference to FIG. 5. The first color filter 20RG1 (first red green RG1) disposed in the first sub-divided pixel 111 that is set in the display state has a color brighter than a color (first blue green BG1) of the second color filter 20BG1. Thus, the pattern L03 is the second combination to which u=0 has been applied.

The pattern L13 is the second combination to which u=1 is applied. The pattern L23 is the second combination to which u=2 is applied. The pattern L33 is the second combination to which u=3 is applied. The pattern H43 is the second combination to which u=4 is applied. The pattern H53 is the second combination to which u=5 is applied. The pattern H63 is the second combination to which u=6 is applied.

The halftone gradation display is, for example, a type of gradation display between first gradation display and second gradation display. In the first gradation display, an area ratio between the sub-divided pixels 50 to be driven and the sub-divided pixels 50 not to be driven in one of the two different types of the sub-pixels is equal to an area ratio between the sub-divided pixels 50 to be driven and the sub-divided pixels 50 not to be driven in the other of the two different types of the sub-pixels. In the second gradation display, an area ratio between the sub-divided pixels 50 to be driven and the sub-divided pixels 50 not to be driven in one of the two different types of the sub-pixels is equal to an area ratio between the sub-divided pixels 50 to be driven and the sub-divided pixels 50 not to be driven in the other of the two different types of the sub-pixels, and an area ratio of the sub-divided pixels 50 to be driven to the sub-divided pixels 50 not to be driven is greater than that in the first gradation display. In the halftone gradation display, the area ratio between the sub-divided pixels 50 to be driven and the sub-divided pixels 50 not to be driven is different between the two different types of the sub-pixels.

Assuming that patterns for the first gradation display are the patterns of the u-step gradation in the N-bit gradation display, patterns for the second gradation display are the patterns of the (u+1)-step gradation in the N-bit gradation display. Patterns for the halftone gradation display include the patterns of the first combination, the patterns of the second combination, or patterns of that are switched between the first combination and the second combination.

The first combination and the second combination in the halftone gradation display are higher in gradation than the u-step gradation in the N-bit gradation display and lower in gradation than the (u+1)-step gradation in the N-bit gradation display. The first combination in the halftone gradation display is lower in gradation than the second combination in the halftone gradation display having a u value identical to a u value of the first combination. For example, the pattern H62 of the first combination to which u=6 is applied is higher in gradation than the six-step gradation in the N-bit gradation display (pattern H61) described with reference to FIG. 5 and lower in gradation than the pattern H63 in the second combination to which u=6 is applied. The pattern H63 of the second combination to which u=6 is applied is lower in gradation than the seven-step gradation in the N-bit gradation display (pattern H71) described with reference to FIG. 5. Although the foregoing description is based on u=6, the same holds for u taking any other value.

FIG. 7 is a diagram illustrating other exemplary patterns of combinations of a plurality of sub-divided pixels 50 in the display state and the non-display state including the halftone gradation display. The halftone gradation display may include the patterns that are switched between the first combination and the second combination at periodic intervals. For example, the pattern L04 in FIG. 7 is a pattern that is switched between the first combination to which u=0 is applied and the second combination. Specifically, the pattern L04 is a pattern that is periodically switched between the pattern L02 and the pattern L03 in FIG. 6. The pattern L14 is a pattern that is periodically switched between the pattern L12 and the pattern L13. The pattern L24 is a pattern that is periodically switched between the pattern L22 and the pattern L23. The pattern L34 is a pattern that is periodically switched between the pattern L32 and the pattern L33. The pattern H44 is a pattern that is periodically switched between the pattern H42 and the pattern H43. The pattern H54 is a pattern that is periodically switched between the pattern H52 and the pattern H53. The pattern H64 is a pattern that is periodically switched between the pattern H62 and the pattern H63.

The patterns that are switched between the first combination and the second combination at periodic intervals are higher in gradation than the u-step gradation in the N-bit gradation display and lower in gradation than the (u+1)-step gradation in the N-bit gradation display. For example, the pattern H64 to which u=6 is applied is higher in gradation than the six-step gradation in the N-bit gradation display (pattern H61) described with reference to FIG. 5 and lower in gradation than the seven-step gradation in the N-bit gradation display (pattern H71) described with reference to FIG. 5. Although the foregoing description is based on u=6, the same holds for u taking any other value.

The switching may be made according to a time period or a space period. When the switching is made according to the time period, each of the pixels 10 is driven on a pixel-by-pixel basis so as to be switched between the first combination and the second combination. When the switching is made according to the space period, among the pixels 10 arrayed in a row-column configuration, the first combination is applied to one or more pixels 10 out of two or more pixels 10 that are adjacent to each other and that output an identical mixed color; and the second combination is applied to one or more of the other pixels 10.

The halftone gradation display may be used for the N-bit gradation display in a range of a predetermined gradation value or higher. For example, the halftone gradation display may be applied to gradation display in a range in which the largest sub-divided pixel 50 out of the sub-divided pixels 50 is used, and not be applied to gradation display outside the range. In this case, the gradation display in the range of the predetermined gradation value or higher is gradation display in the range of a $2^{(N-1)}$ and higher-step gradation.

With reference to FIGS. 6 and 7, the patterns for N-bit gradation display in which the largest sub-divided pixel 50 out of the sub-divided pixels 50 is used are the pattern H41, the pattern H51, the pattern H61, and the pattern H71. Thus, in the halftone gradation display in FIG. 6, patterns of the first combination within the range in which the largest sub-divided pixel 50 out of the sub-divided pixels 50 is used are the pattern H42, the pattern H52, and the pattern H62. In the halftone gradation display in FIG. 6, patterns of the second combination within the range in which the largest sub-divided pixel 50 out of the sub-divided pixels 50 is used are the pattern H43, the pattern H53, and the pattern H63. In the halftone gradation display in FIG. 7, switching patterns within the range in which the largest sub-divided pixel 50 out of the sub-divided pixels 50 is used are the pattern H44, the pattern H54, and the pattern H64. Performing the halftone gradation display by using only the patterns in which the largest sub-divided pixel 50 out of the sub-divided pixels 50 is used can further lower the possibility that a difference in color between the first combination and the second combination is visually recognized. Using the patterns that are switched between the first combination and the second combination can prevent relatively large fluctuation in luminance caused by switching between the display state and the non-display state of the largest sub-divided pixel 50 out of the sub-divided pixels 50. As a result, the configuration can further lower the possibility that periodic fluctuation in luminance in the patterns that are switched between the first combination and the second combination is visually recognized. The foregoing describes the cases in which the halftone gradation display is used for the gradation display in the range of the $2^{(N-1)}$ ($4=2^{(3-1)}$) or higher step gradation out of the N-bit (N=3) gradation display. These cases are merely examples and are not intended to limit the present disclosure. The range of the predetermined gradation value or higher is an arbitrary range.

While the foregoing describes the halftone gradation display with reference to FIGS. 5 to 7, the halftone gradation display is not limited to the cases in which the sub-divided pixels 50 included in the first sub-pixel 11 and the second sub-pixel 12 are used. The halftone gradation display is applicable to cases in which the sub-divided pixels 50 included in two different types of sub-pixels 15 are used. As a method for displaying purple with halftone, for example, halftone may be achieved by using different combinations of the sub-divided pixels 50 between the sub-pixels 15 of the red (R1) and the blue (B1).

The following describes a more detailed configuration of the display device 1 with reference to FIGS. 8 to 12.

Figure 8:
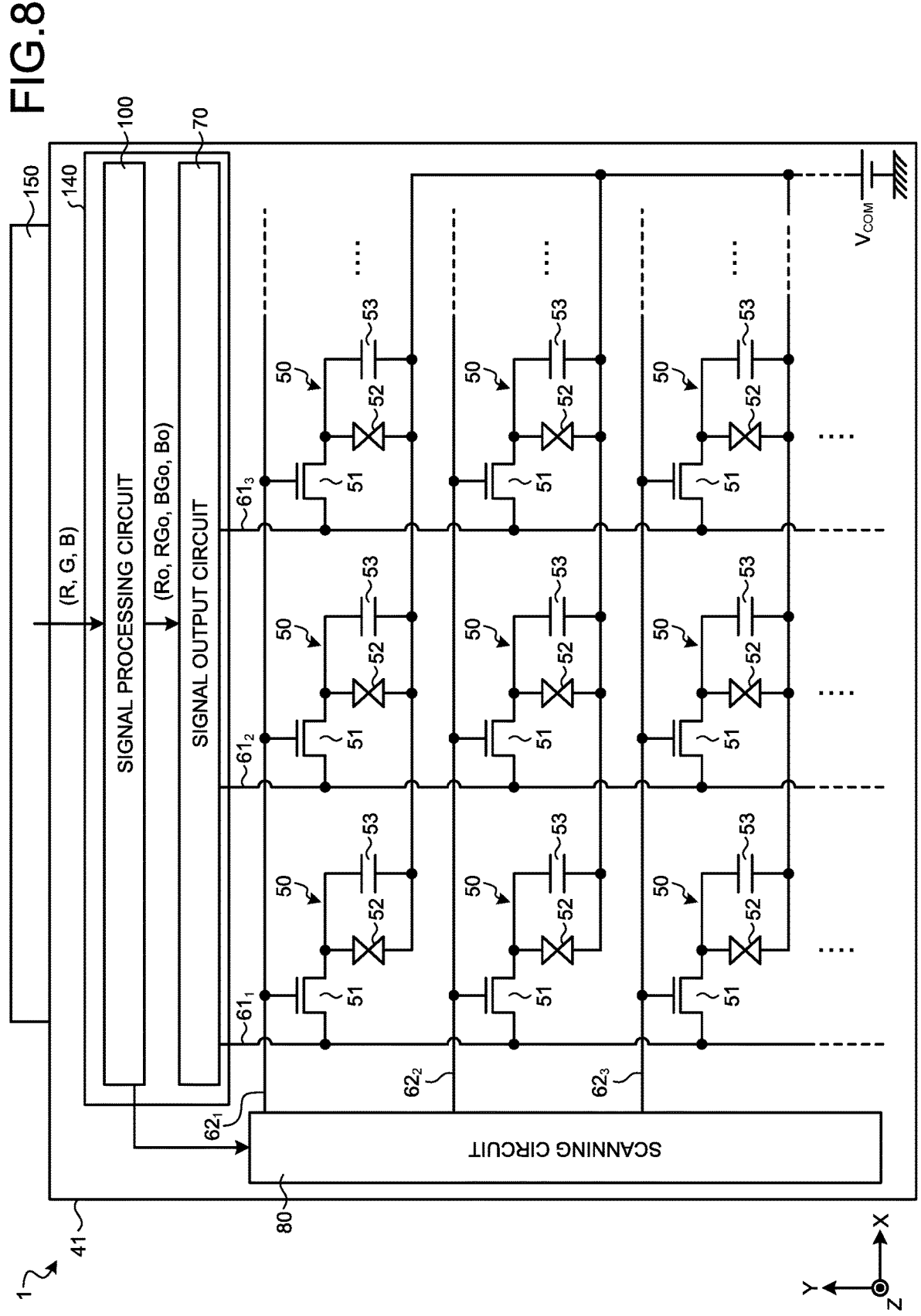
FIG. 8 is a diagram illustrating an exemplary circuit configuration of a display device.

FIG. 8 is a diagram illustrating an exemplary circuit configuration of the display device 1. In FIG. 8, a second substrate 21 to be described later is omitted. The X-direction in FIG. 8 indicates a row direction of the display device 1, and the Y-direction in FIG. 8 indicates a column direction of the display device 1. As illustrated in FIG. 8, the sub-divided pixel 50 includes, for example, a pixel transistor 51 employing a thin-film transistor (TFT), a liquid crystal capacitor 52, and a holding capacitor 53. The pixel transistor 51 has a gate electrode coupled with a scanning line 62 (62$_1$, 62$_2$, 62$_3$, . . . ) and a source electrode coupled with a signal line 61 (61$_1$, 61$_2$, 61$_3$, . . . ). Another possible configuration to be employed is that the sub-divided pixel 50 does not include the holding capacitor 53.

The liquid crystal capacitor 52 denotes a capacitance component of a liquid crystal material generated between the reflective electrode 40 provided for each sub-divided pixel 50 and a counter electrode 22 (see FIG. 9) facing some of or all of the reflective electrodes 40. The reflective electrode 40 is coupled with a drain electrode of the pixel transistor 51. A common potential $V_{COM}$ is applied to the counter electrode 22. The common potential $V_{COM}$ is inverted at predetermined cycles in order to drive the sub-divided pixel 50 in an inverted manner. The holding capacitor 53 has two electrodes. One of the electrodes has a potential identical to that of the reflective electrode 40 and the other of the electrodes has a potential identical to that of the counter electrode 22.

The sub-divided pixels 50 are disposed at intersections of the signal lines 61 and the scanning lines 62 such that each pixel transistor 51 is coupled with the signal line 61 extending in the column direction and the scanning line 62 extending in the row direction. The signal lines 61 (61$_1$, 61$_2$, 61$_3$, . . . ) each have one end coupled with an output terminal corresponding to each column of a signal output circuit 70. The scanning lines (62$_1$, 62$_2$, 62$_3$, . . . ) each have one end coupled with an output terminal corresponding to each row of a scanning circuit 80. The signal lines 61 (61$_1$, 61$_2$, 61$_3$, . . . ) are wiring that transmits a signal for driving the sub-divided pixels 50, i.e., a video signal output from the signal output circuit 70, to the sub-divided pixels 50, on a pixel column by pixel column basis. The scanning lines 62 (62$_1$, 62$_2$, 62$_3$, . . . ) are wiring that transmits a signal for selecting the sub-divided pixels 50 row by row, i.e., a scanning signal output from the scanning circuit 80, to each pixel row.

The signal output circuit 70 and the scanning circuit 80 are coupled with a signal processing circuit 100. The signal processing circuit 100 calculates a gradation value (R1, RG, BG, and B1 to be described later) of each of four sub-pixels 15 included in each pixel (e.g., pixel 10) in accordance with the gradation values of R, G, and B input to the display device 1. The signal processing circuit 100 outputs to the signal output circuit 70 a calculation result as area coverage modulation signals (Ro, RGo, BGo, and Bo) of each pixel. The signal output circuit 70 transmits to each sub-divided pixel 50 the video signal including the area coverage modulation signals (Ro, RGo, BGo, and Bo). The signal processing circuit 100 outputs to the signal output circuit 70 and the scanning circuit 80 clock signals for synchronizing operations of the signal output circuit 70 and the scanning circuit 80. The scanning circuit 80 scans the sub-divided pixels 50 in synchronism with the video signal from the signal output circuit 70. The present disclosure may employ a configuration in which the signal output circuit 70 and the signal processing circuit 100 are included in a single IC chip 140, for example, as illustrated in FIG. 8, or a configuration in which the signal output circuit 70 and the signal processing circuit 100 are individual circuit chips. FIG. 8 illustrates circuit chips including the IC chip 140 disposed on a first substrate 41 using a Chip-On-Glass (COG) technique. This is merely one example of implementation of the circuit chips, and the present disclosure is not limited thereto. The circuit chips may be mounted on, for example, a flexible printed circuit (FPC) coupled with the first substrate 41, using a Chip-On-Film (COF) technique.

Figure 9:
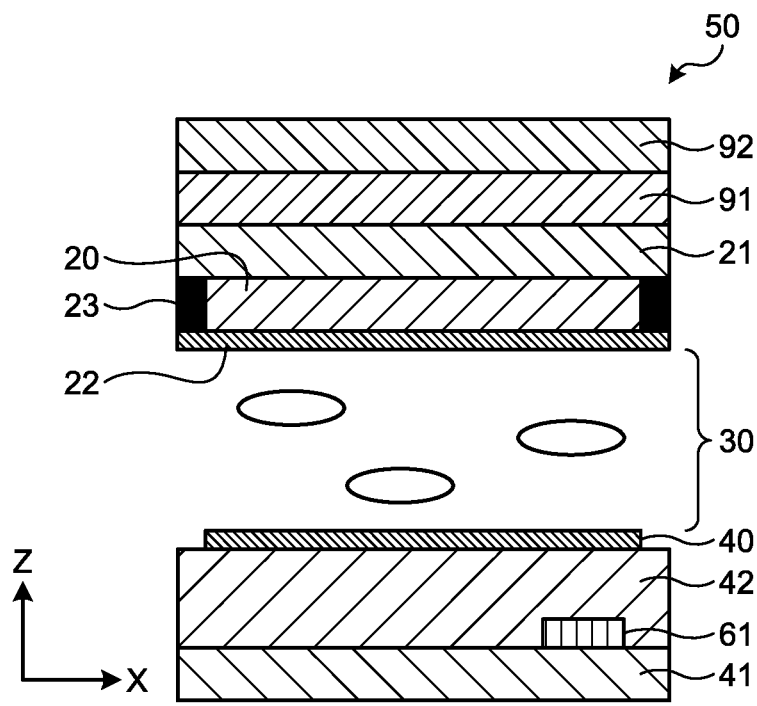
FIG. 9 is a cross-sectional view schematically illustrating a sub-divided pixel.

FIG. 9 is a cross-sectional view schematically illustrating the sub-divided pixel 50. The reflective electrode 40 faces the counter electrode 22 with the liquid crystal layer 30 interposed therebetween. The reflective electrode 40 is provided to the first substrate 41. Specifically, wiring including the signal line 61 and the scanning line 62, and an insulation layer 42 are stacked on a surface of the first substrate 41, the surface facing the liquid crystal layer 30. The insulation layer 42 insulates one wiring from another wiring and from electrodes. The reflective electrode 40 is a film-shaped electrode formed on a surface of the insulation layer 42. The counter electrode 22 and the color filter 20 are provided to the second substrate 21. Specifically, the color filter 20 is disposed on a surface of the second substrate 21, the surface facing the liquid crystal layer 30. The black matrix 23 is disposed among the color filters 20. The counter electrode 22 is a film-shaped electrode formed on a surface of the color filter 20.

The sub-divided pixel 50 illustrated in FIG. 9 represents one of the sub-divided pixels 50 provided for gradation display by area coverage modulation as described above with reference to FIG. 2.

The first substrate 41 and the second substrate 21 are, for example, glass substrates that transmit light. The counter electrode 22 transmits light and is formed of, for example, indium tin oxide (ITO). The reflective electrode 40 is a metal electrode that is formed of thin film silver (Ag) or aluminum (Al), for example, and that reflects the external light IL. A portion of the reflective electrode 40 reflecting the external light IL may be a flat surface intended for mirror reflection or an irregular surface intended for scattering of the light OL.

The liquid crystal layer 30 is sealed with a sealing material, which is not illustrated. The sealing material seals the liquid crystal layer 30 by bonding the first substrate 41 and the second substrate 21 at their ends. A spacer, which is not illustrated, defines a distance between the reflective electrode 40 and the counter electrode 22. An initial orientation state of liquid crystal molecules of the liquid crystal layer 30 is determined by orientation films (not illustrated) provided to the respective first substrate 41 and second substrate 21. According to the embodiment, the sub-divided pixels 50 are in the non-display state in the initial orientation state. The state of not transmitting the light OL in the initial orientation state in which no electric field is applied to the liquid crystal layer 30 is referred to as a normally black state.

The spectrum of the light transmitted through the color filter 20 illustrated in FIG. 9 has a peak that falls on any one of the spectrum of reddish green, the spectrum of bluish green, the spectrum of red, and the spectrum of blue, as described with reference to FIG. 2.

As described above, the display device 1 includes: the first substrate 41 provided with the reflective electrode 40; the second substrate 21 provided with the color filter 20 and the translucent electrode (counter electrode 22); and the liquid crystal layer 30 disposed between the reflective electrode 40 and the translucent electrode.

The display device 1 employs the sub-divided pixel 50 according to a memory-in-pixel (MIP) technology to have a memory function. According to the MIP technology, the sub-divided pixel 50 has a memory to store data, thereby allowing the display device 1 to perform display in a memory display mode. The memory display mode allows the gradation of the sub-divided pixel 50 to be digitally displayed based on binary information (logic "1" and logic "0") stored in the memory in the sub-divided pixel 50.

Figure 10:
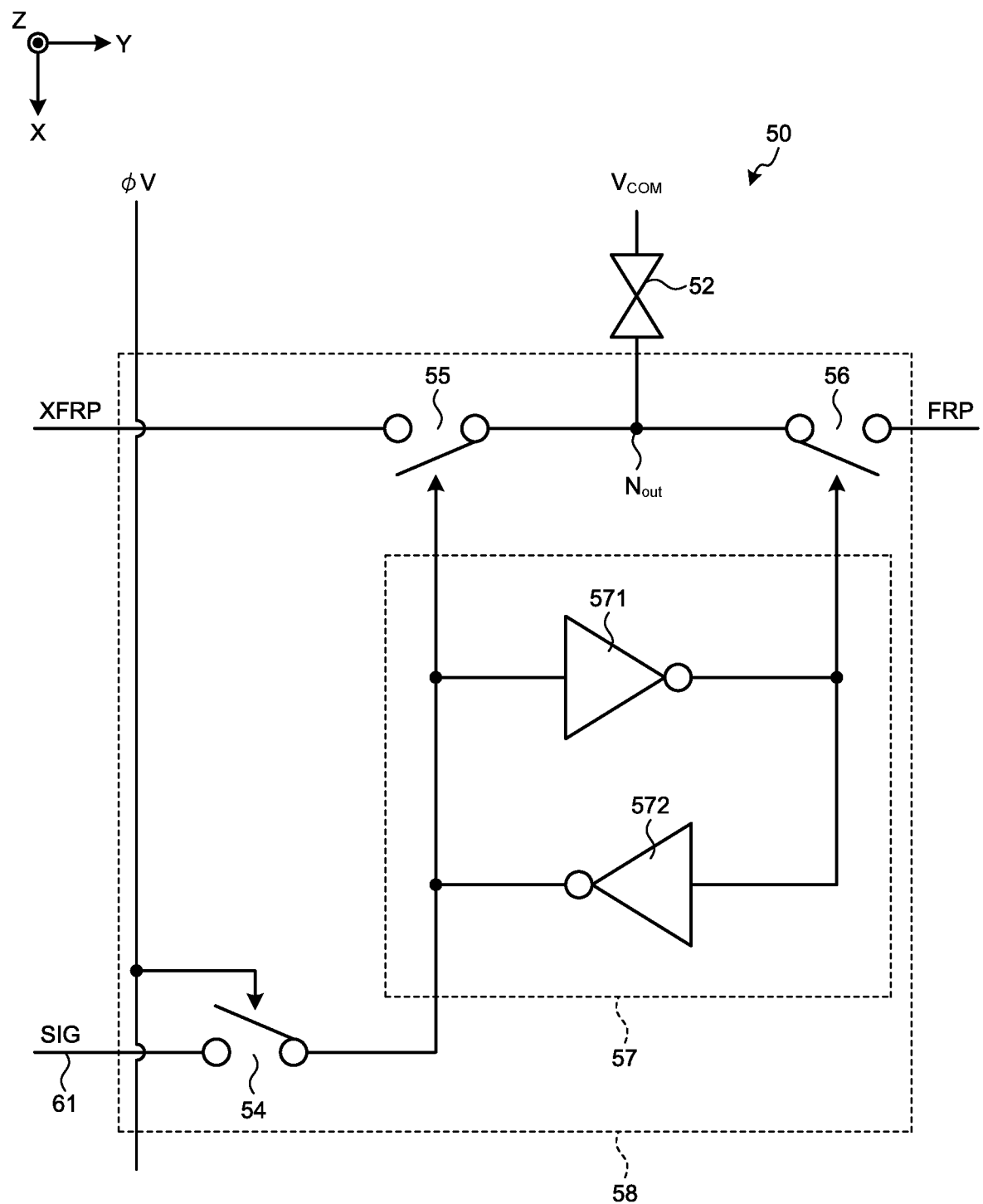
FIG. 10 is a block diagram illustrating an exemplary circuit configuration of the pixel employing a memory in pixel (MIP) technology.
Figure 11:
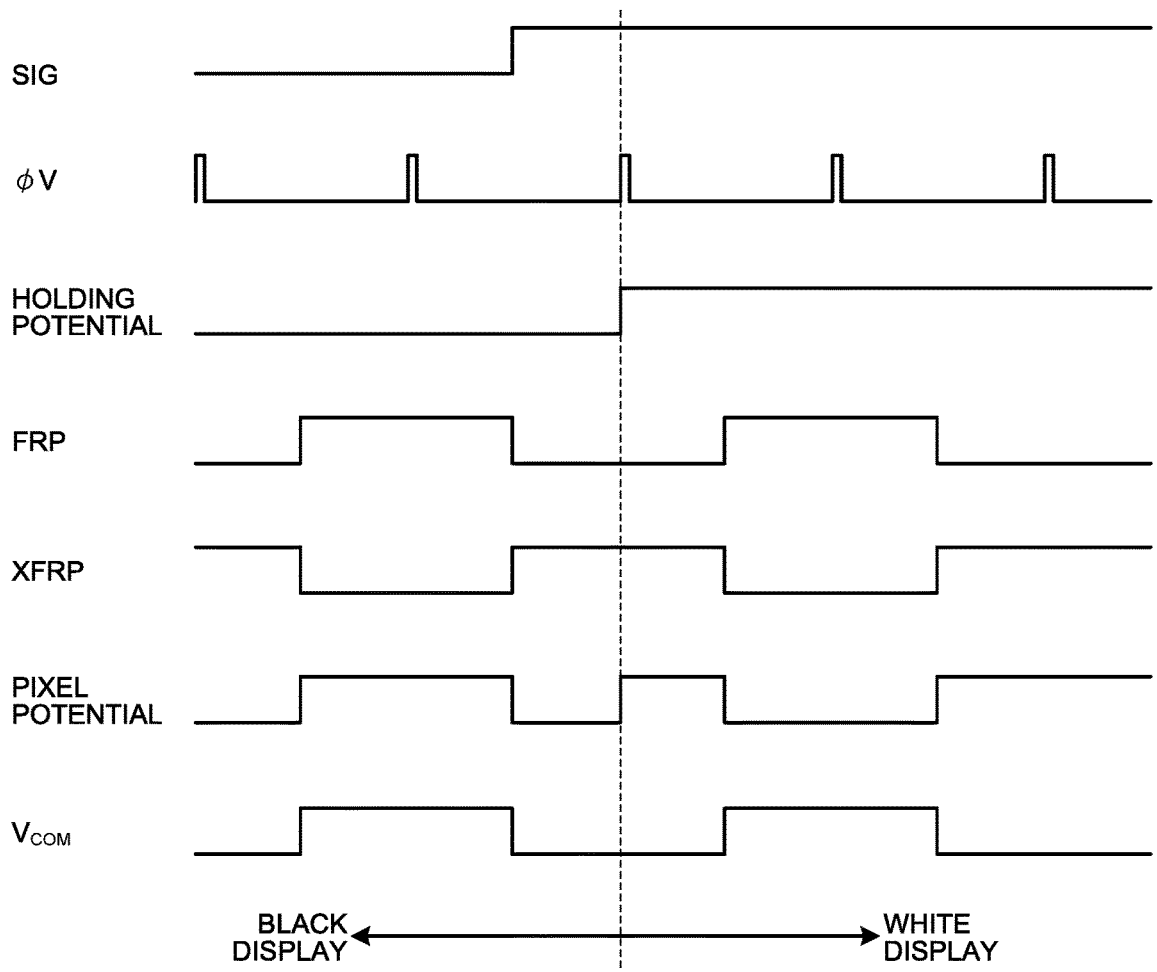
FIG. 11 is a timing chart for explaining an operation of the pixel employing the MIP technology.

FIG. 10 is a block diagram illustrating an exemplary circuit configuration of the sub-divided pixel 50 employing the MIP technology. FIG. 11 is a timing chart for explaining an operation of the sub-divided pixel 50 employing the MIP technology. As illustrated in FIG. 10, the sub-divided pixel 50 includes a drive circuit 58 in addition to the liquid crystal capacitor (liquid crystal cell) 52. The drive circuit 58 includes three switching devices 54, 55, and 56 and a latch 57. The drive circuit 58 has a static random access memory (SRAM) function. The sub-divided pixel 50 including the drive circuit 58 is configured to have the SRAM function.

The switching device 54 has one end coupled with the signal line 61. The switching device 54 is turned ON (closed) by a scanning signal V applied from the scanning circuit 80, so that the drive circuit 58 obtains data SIG supplied from the signal output circuit 70 via the signal line 61. The latch 57 includes inverters 571 and 572 that are coupled in parallel with each other in directions opposite to each other. The latch 57 holds (latches) a potential corresponding to the data SIG obtained through the switching device 54.

A control pulse XFRP having a phase opposite to that of the common potential $V_{COM}$ is applied to one terminal of the switching device 55. A control pulse FRP having a phase identical to that of the common potential $V_{COM}$ is applied to one terminal of the switching device 56. The switching devices 55 and 56 each have the other terminal coupled with a common connection node. The common connection node serves as an output node $N_{out}$. Either one of the switching devices 55 and 56 is turned ON depending on a polarity of the holding potential of the latch 57. Through the foregoing operation, the control pulse FRP or the control pulse XFRP is applied to the reflective electrode 40 while the common potential $V_{COM}$ is being applied to the counter electrode 22 that generates the liquid crystal capacitor 52.

When the holding potential of the latch 57 has a negative polarity, the pixel potential of the liquid crystal capacitor 52 is in the same phase with that of the common potential $V_{COM}$, causing no potential difference between the reflective electrode 40 and the counter electrode 22. Thus, no electric field is generated in the liquid crystal layer 30. Consequently, in this case, the liquid crystal molecules are not twisted from the initial orientation state and the normally black state is maintained. As a result, the light OL is not transmitted in this sub-divided pixel 50 (non-display state). On the other hand, when the holding potential of the latch 57 has a positive polarity, the pixel potential of the liquid crystal capacitor 52 is in an opposite phase of that of the common potential $V_{COM}$, causing a potential difference between the reflective electrode 40 and the counter electrode 22. An electric field is then generated in the liquid crystal layer 30. The electric field causes the liquid crystal molecules to be twisted from the initial orientation state and to change orientation thereof. Thus, the light OL is transmitted in the sub-divided pixel 50 (display state). As described above, in the display device 1, the sub-divided pixels 50 each include a holder (latch 57) that holds a potential variable according to the gradation display.

In each sub-divided pixel 50, the control pulse FRP or the control pulse XFRP is applied to the reflective electrode 40 generating the liquid crystal capacitor 52 when either one of the switching devices 55 and 56 is turned ON depending on the polarity of the holding potential of the latch 57. Transmission of the light OL is thereby controlled for the sub-divided pixel 50.

The foregoing describes the example in which the sub-divided pixel 50 employs the SRAM as a memory incorporated in the sub-divided pixel 50. The SRAM is, however, illustrative only and the embodiment may employ other types of memory, for example, a dynamic random access memory (DRAM).

Figure 12:
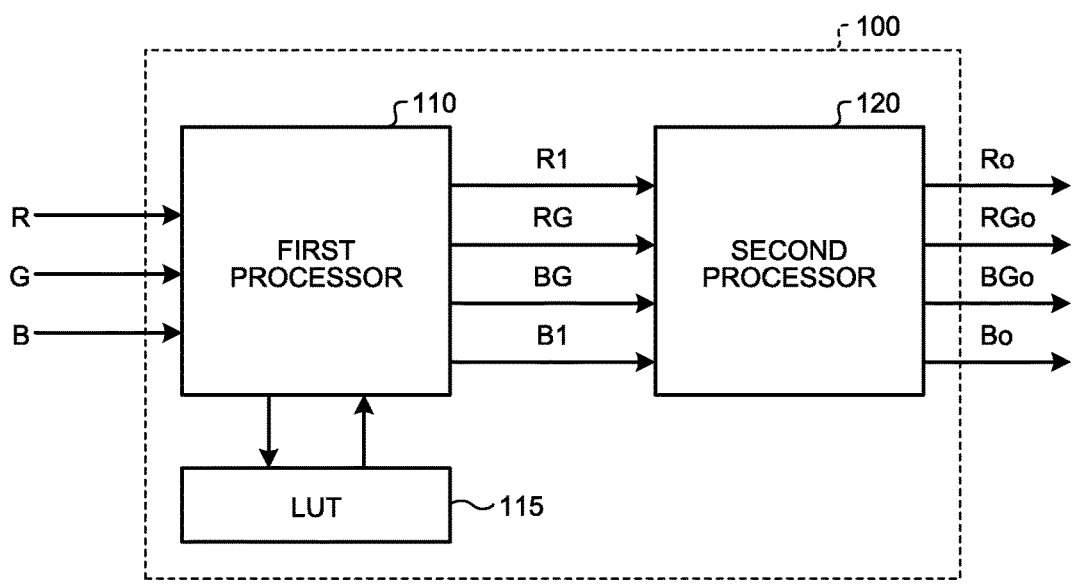
FIG. 12 is a block diagram illustrating an exemplary configuration of a signal processing circuit.

FIG. 12 is a block diagram illustrating an exemplary configuration of the signal processing circuit. The signal processing circuit 100 includes a first processor 110, a second processor 120, and a look-up table (LUT) 115. The first processor identifies the gradation values (R1, RG, BG, and B1) of the respective four sub-pixels 15 included in each pixel (e.g., pixel 10) according to the input gradation values of R, G, and B. The gradation value of "RG" out of the gradation values (R1, RG, BG, and B1) of the respective four sub-pixels 15 is the gradation value of any one of, for example, the first red green RG1, and a second red green RG2 and a third red green RG3 to be described later. Specifically, "RG" corresponds to the peak of the spectrum of the light transmitted through the first color filter included in the first sub-pixel. The gradation value of "BG" is the gradation value of any one of, for example, the first blue green BG1, and a second blue green BG2 and a third blue green BG3 to be described later. Specifically, "BG" corresponds to the peak of the spectrum of the light transmitted through the second color filter included in the second sub-pixel. The gradation value of "R1" is the gradation value of the red (R1), for example. Specifically, "R1" corresponds to the peak of the spectrum of the light transmitted through the third color filter included in the third sub-pixel. Further, the gradation value of "B1" is the gradation value of the blue (B1), for example. Specifically, "B1" corresponds to the peak of the spectrum of the light transmitted through the fourth color filter included in the fourth sub-pixel.

The LUT 115 is table data including the information on the gradation values of the respective four sub-pixels 15 predetermined for the gradation values of R, G, and B. The following describes an example in which the LUT 115 determines the gradation value of each of the first sub-pixel 11, the second sub-pixel 12, the third sub-pixel 13, and the fourth sub-pixel 14 illustrated in FIG. 2. The first processor 110 refers to the LUT 115 and identifies the gradation values of (R1, RG1, BG1, and B1) corresponding to the input gradation values of R, G, and B. For example, when the input gradation values of R, G, and B are expressed as (R, G, B)=(n, n, n) as illustrated in FIG. 4, the first processor 110 refers to the LUT 115 and identifies the gradation values as (R1, RG1, BG1, B1)=(n1, n2, n3, n4), where (n1, n2, n3, n4) represent colors of the first sub-pixel 11, the second sub-pixel 12, the third sub-pixel 13, and the fourth sub-pixel 14 and are gradation values for reproducing colors corresponding to (R, G, B)=(n, n, n). The same applies to a case in which the input gradation values of R, G, and B are other gradation values. When the input gradation values of R, G, and B are expressed as (R, G, B)=(n, 0, 0), the first processor 110 identifies the gradation values as (R1, RG1, BG1, B1)=(n, 0, 0, 0). When the input gradation values of R, G, and B are expressed as (R, G, B)=(0, n, 0), the first processor 110 identifies the gradation values as (R1, RG1, BG1, B1)=(0, n5, n6, 0). When the input gradation values of R, G, and B are expressed as (R, G, B)=(0, 0, n), the first processor 110 identifies the gradation values as (R1, RG1, BG1, B1)=(0, n5, n6, 0). When the input gradation values of R, G, and B are expressed as (R, G, B)=(m, m, 0), the first processor 110 identifies the gradation values as (R1, RG1, BG1, B1)=(m1, m2, m3, 0). When the input gradation values of R, G, and B are expressed as (R, G, B)=(0, m, m), the first processor 110 identifies the gradation values as (R1, RG1, BG1, B1)=(0, m4, m5, m6). When the input gradation values of R, G, and B are expressed as (R, G, B)=(m, 0, m), the first processor 110 identifies the gradation values as (R1, RG1, BG1, B1)=(m7, 0, 0, m8).

The second processor 120 outputs to the signal output circuit 70 the area coverage modulation signals (Ro, RGo, BGo, and Bo) of the respective sub-divided pixels corresponding to the gradation values (R1, RG, BG, and B1) (e.g., R1, RG1, BG1, and B1) of each of the four sub-pixels 15. For example, when the gradation values of the colors of (R1, RG1, BG1, and B1) identified by the first processor 110 are 8-bit numeric values (0 to 255), the second processor 120 converts the 8-bit numeric values into the area coverage modulation signals corresponding to the N-bit gradation display or the area coverage modulation signals corresponding to the halftone gradation display. The following exemplifies the N-bit gradation display. When N=3, for example, a correspondence relation between the gradation (u: 0 to 7) indicated by the area coverage modulation signals corresponding to the N-bit gradation display and the 8-bit gradation values (0 to 255) may be classified as follows:

0: 0 to 31;
1: 32 to 63;
2: 64 to 95;
3: 96 to 127;
4: 128 to 159;
5: 160 to 191;
6: 192 to 223; and
7: 224 to 255.

The foregoing classification example assumes the gradation values corresponding to a linear space ranging from 0 to 1.0 in which the gradation values are not subjected to gamma correction. When the gamma correction is performed, a classification may be changed. In accordance with the foregoing correspondence relation, the second processor 120 converts (R1, RG1, BG1, and B1) into the area coverage modulation signals corresponding to the N-bit gradation display values. As an example for the N-bit gradation display, the second processor 120 converts (R1, RG1, BG1, B1)=(10, 100, 200, 255) to the area coverage modulation signals of (Ro, RGo, BGo, Bo)=(0, 4, 6, 7), and outputs the area coverage modulation signals to the signal output circuit 70. The foregoing processing achieves the area coverage modulation display corresponding to the input gradation values. Employing the halftone gradation display makes the correspondence relation even more subdivided than the case of employing the N-bit gradation display. For example, the halftone gradation display described with reference to FIG. 7 can achieve the gradation display of a twofold gradation compared to the case of employing only the N-bit gradation display as follows:

Pattern L01 (u=0): 0 to 15;
Pattern L04 (u=0): 16 to 31;
Pattern L11 (u=1): 32 to 47; and
Pattern L14 (u=1): 48 to 63 . . . .

The halftone gradation display described with reference to FIG. 6 can achieve the gradation display of a threefold gradation compared to the case of employing only the N-bit gradation display.

In the halftone gradation display, the patterns that are switched between the first combination and the second combination (see FIG. 7) may be set as patterns corresponding to gradations between the patterns corresponding to the first combination and the patterns corresponding to the second combination (see FIG. 6). The foregoing arrangement can achieve the gradation display of a fourfold gradation compared to the case of employing only the N-bit gradation display.

Figure 13:
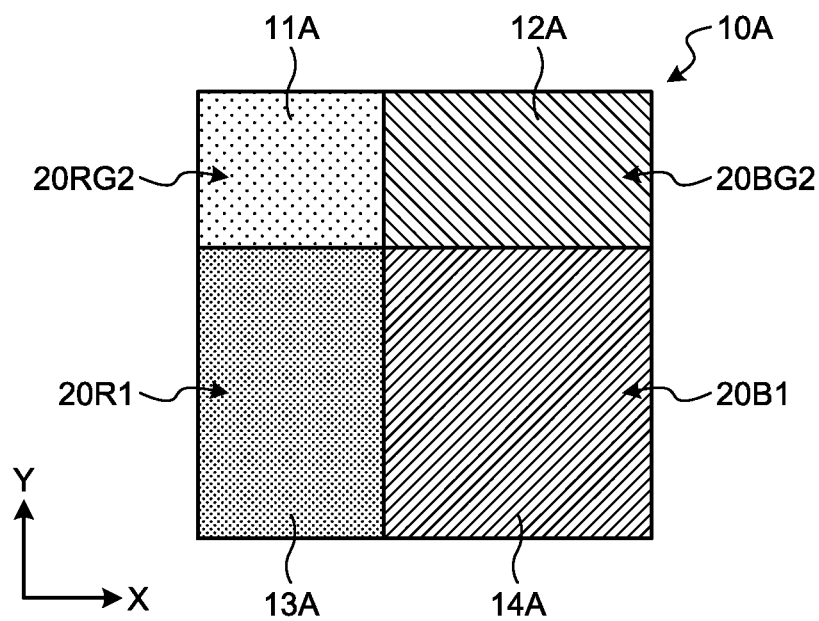
FIG. 13 is a diagram illustrating exemplary shapes and sizes of sub-pixels included in a single pixel, an exemplary positional relation among the sub-pixels, and exemplary color filters of the respective sub-pixels.
Figure 14:
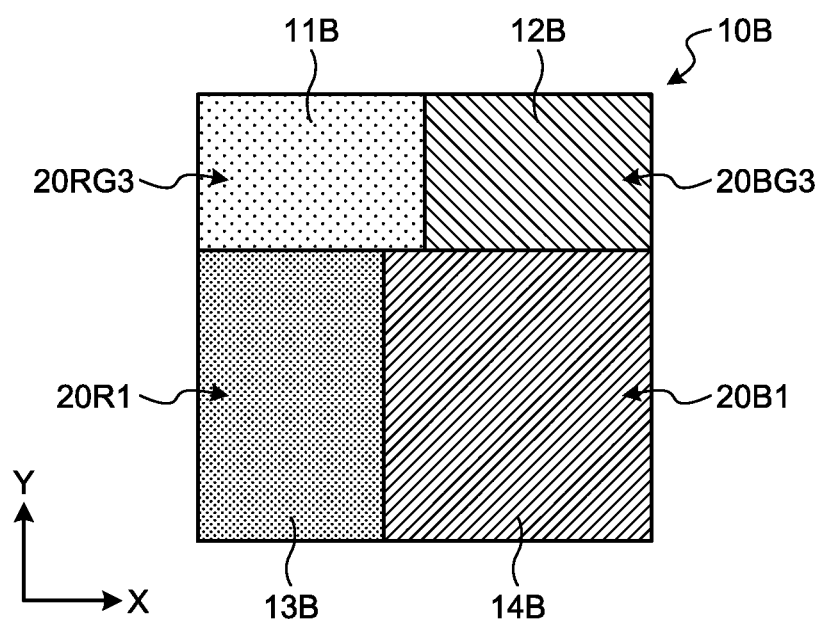
FIG. 14 is a diagram illustrating exemplary shapes and sizes of sub-pixels included in a single pixel, an exemplary positional relation among the sub-pixels, and exemplary color filters of the respective sub-pixels.

FIG. 13 is a diagram illustrating exemplary shapes and sizes of the sub-pixels 15 included in a single pixel 10A, an exemplary positional relation among the sub-pixels 15, and exemplary color filters 20 of the respective sub-pixels 15. FIG. 14 is a diagram illustrating exemplary shapes and sizes of sub-pixels 15 included in a single pixel 10B, an exemplary positional relation among the sub-pixels 15, and exemplary color filters 20 of the respective sub-pixels 15. The display device 1 may include, in place of the pixel 10 illustrated in FIG. 2, the pixel 10A illustrated in FIG. 13 or the pixel 10B illustrated in FIG. 14.

The pixel 10A illustrated in FIG. 13 includes a first sub-pixel 11A, a second sub-pixel 12A, a third sub-pixel 13A, and a fourth sub-pixel 14A. The first sub-pixel 11A includes a first color filter 20RG2. The second sub-pixel 12A includes a second color filter 20BG2. The peak of the spectrum of the light transmitted through the first color filter 20RG2 falls on the spectrum of the reddish green (second red green RG2). The peak of the spectrum of the light transmitted through the second color filter 20BG2 falls on the spectrum of the bluish green (second blue green BG2). The third sub-pixel 13A includes the third color filter 20R1, similarly to the third sub-pixel 13 illustrated in FIG. 2. The fourth sub-pixel 14A includes the fourth color filter 20B1, similarly to the fourth sub-pixel 14 illustrated in FIG. 2. The area of the third sub-pixel 13A and the area of the fourth sub-pixel 14A are each greater than the area of the first sub-pixel 11A and the area of the second sub-pixel 12A. The sum of the areas of the first sub-pixel 11A and the second sub-pixel 12A is equal to or greater than the area of the third sub-pixel 13A and is equal to or greater than the area of the fourth sub-pixel 14A. The area of the fourth sub-pixel 14A is greater than the area of the third sub-pixel 13A. The area of the second sub-pixel 12A is greater than the area of the first sub-pixel 11A. When an area ratio of the first sub-pixel 11A, the second sub-pixel 12A, the third sub-pixel 13A, and the fourth sub-pixel 14A is expressed as E to F to G to H, for example, the following expressions hold: $0.65 \leq E < F < 1.0$, $1.0 \leq G < H$, and $H < 1.7$. Further, the relation of E to F=G to H holds in the example illustrated in FIG. 13, but E to F may be a different ratio from that of G to H. A configuration in which the relation of E to F=G to H holds makes it easy to dispose the signal line 61 and the scanning line 62 (see FIG. 8) at a position corresponding to a boundary between sub-pixels 15 having different color filters 20. FIG. 13 illustrates an exemplary case in which the ratio obtained through rounding each value to the third decimal places is expressed as E to F to G to H=0.669 to 0.819 to 1.130 to 1.382. In this case, the sum of the areas of the first sub-pixel 11 and the second sub-pixel 12 is equal to or greater than the area of the third sub-pixel 13 and is equal to or greater than the area of the fourth sub-pixel 14. Color reproduction by the pixel 10A illustrated in FIG. 13 can be described by reading the first sub-pixel 11, the second sub-pixel 12, the third sub-pixel 13, and the fourth sub-pixel 14 described with reference to FIG. 4 as the first sub-pixel 11A, the second sub-pixel 12A, the third sub-pixel 13A, and the fourth sub-pixel 14A, respectively.

The pixel 10B illustrated in FIG. 14 includes a first sub-pixel 11B, a second sub-pixel 12B, a third sub-pixel 13B, and a fourth sub-pixel 14B. The first sub-pixel 11B includes a first color filter 20RG3. The second sub-pixel 12B includes a second color filter 20BG3. The peak of the spectrum of the light transmitted through the first color filter 20RG3 falls on the spectrum of the reddish green (third red green RG3). The peak of the spectrum of the light transmitted through the second color filter 20BG3 falls on the spectrum of the bluish green (third blue green BG3). The third sub-pixel 13B includes the third color filter 20R1, similarly to the third sub-pixel 13 illustrated in FIG. 2. The fourth sub-pixel 14B includes the fourth color filter 20B1, similarly to the fourth sub-pixel 14 illustrated in FIG. 2. Color reproduction by the pixel 10B illustrated in FIG. 14 can be described by reading the first sub-pixel 11, the second sub-pixel 12, the third sub-pixel 13, and the fourth sub-pixel 14 described with reference to FIG. 4 as the first sub-pixel 11B, the second sub-pixel 12B, the third sub-pixel 13B, and the fourth sub-pixel 14B, respectively.

The area of the third sub-pixel 13B and the area of the fourth sub-pixel 14B are each greater than the area of the first sub-pixel 11B and the area of the second sub-pixel 12B. The sum of the areas of the first sub-pixel 11B and the second sub-pixel 12B is equal to or greater than the area of the third sub-pixel 13B. The area of the fourth sub-pixel 14B is greater than the area of the third sub-pixel 13B. The area of the first sub-pixel 11B is identical to the area of the second sub-pixel 12B. When an area ratio of the first sub-pixel 11B, the second sub-pixel 12B, the third sub-pixel 13B, and the fourth sub-pixel 14B is expressed as I to J to K to L, the following expressions hold: $0.65 \leq I = J < 1.0$, $1.0 \leq K < L$, $L = 4 - (I+J+K)$, and $L \leq 1.7$. FIG. 14 illustrates an exemplary case in which the expression of I to J to K to L=0.744 to 0.744 to 1.130 to 1.382 holds. In this case, the sum of the areas of the first sub-pixel 11B and the second sub-pixel 12B is equal to or greater than the area of the third sub-pixel 13B and is equal to or greater than the area of the fourth sub-pixel 14B.

Figure 15:
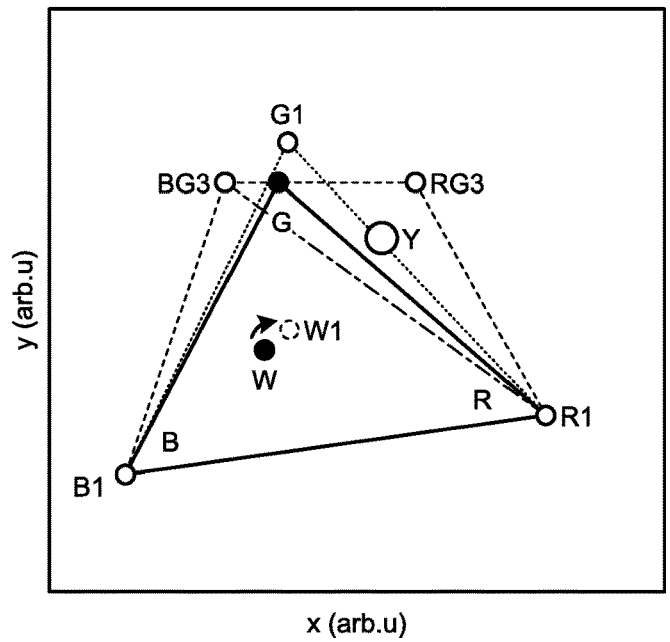
FIG. 15 is a chart indicating a schematic chromaticity diagram (xy chromaticity diagram) that represents a correspondence relation between yellow reproduced by the display device and the peaks of spectra of light transmitted through the color filter, the chromaticity diagram being plotted within chromaticity coordinates (xy chromaticity coordinates)

FIG. 15 is a chart indicating a schematic chromaticity diagram (xy chromaticity diagram) that represents a correspondence relation between yellow reproduced by the display device and the peaks of the spectra of the light transmitted through the color filter 20, the chromaticity diagram being plotted within chromaticity coordinates (xy chromaticity coordinates). In FIG. 15, the solid-line triangle having three vertexes of R, G, and B represents a color space that indicates colors that can be reproduced by sub-pixels of respective three colors of the conventional red (R), conventional green (G), and conventional blue (B) included in the conventional display device, with respect to the reproduction of yellow Y having predetermined luminance and saturation required for a display device. Such a conventional display device is unable to reproduce the yellow Y. Specifically, the luminance and saturation of yellow to be reproduced by the conventional display device are unable to exceed luminance and saturation on a straight line connecting the conventional red (R) and the conventional green (G) with respect to a white point (W), and at least either one of the luminance and saturation fails to reach the value to reproduce the yellow Y. Even when the conventional display device includes sub-pixels of four colors of white (W) added to the conventional red (R), the conventional green (G), and the conventional blue (B), increasing saturation of the yellow Y using the sub-pixel of white (W) is a difficult task to achieve.

Trying to reproduce the yellow Y using the sub-pixels of three colors by a conventional technology requires the conventional red (R) and the conventional green (G) to be shifted to red (e.g., R1) and green (e.g., G1) that can reproduce the yellow Y. However, shifting the conventional red (R) and the conventional green (G) to the red (e.g., R1) and the green (e.g., G1) that can reproduce the yellow Y by simply targeting the reproduction of the yellow Y causes the white point (W) to be shifted toward the yellow Y. Specifically, setting the red (e.g., R1) and the green (e.g., G1) by targeting the reproduction of the yellow Y in the conventional display device causes a color reproduced by lighting all sub-pixels to be tinged with yellow as a whole, resulting in changing color reproducibility. FIG. 15 schematically indicates the white point (W) before being shifted toward the yellow Y using a black dot. FIG. 15 further indicates the white point after having been shifted toward the yellow Y using a blank dot outlined by the broken line and denoted as W1. Setting the red (e.g., R1) and the green (e.g., G1) by targeting the reproduction of the yellow Y means to further darken these colors, and reduce light transmission efficiency of the color filter 20 and luminance, resulting in low luminous efficacy and dark yellow.

Trying to achieve the luminance and the saturation corresponding to the yellow Y by adding the yellow sub-pixel to the pixel of the conventional display device still causes the color reproduced by lighting all sub-pixels to be tinged with yellow as a whole, resulting in changing color reproducibility.

In the example illustrated in FIG. 14, on the other hand, the first sub-pixel 11 includes the first color filter 20RG1, and the second sub-pixel 12B includes the second color filter 20BG3. The peak of the spectrum of the light transmitted through the first color filter 20RG1 falls on the spectrum of the reddish green (first red green RG1). The peak of the spectrum of the light transmitted through the second color filter 20BG3 falls on the spectrum of the bluish green (first blue green BG3). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). More specifically, by representing the peak of the spectrum of the light that passes through the first color filter on the chromaticity coordinates (RG1 in FIG. 5), the x-coordinate of the peak is between the x-coordinate of the white point and the x-coordinate of the red (R1 in FIG. 5) corresponding to the third color filter 20R1. Similarly, by representing the peak of the spectrum of the light that passes through the second color filter on the chromaticity coordinates (BG1 in FIG. 5), the x-coordinate of the peak is between the x-coordinate of the white point and the x-coordinate of the blue (B1 in FIG. 5) corresponding to the fourth color filter 20B1. Thus, the example obtains a blue component through the second sub-pixel 12B and the fourth sub-pixel 14B, thereby preventing the white point (W) from being shifted toward the yellow Y. The example reproduces yellow through the combination of the first sub-pixel 11B, the second sub-pixel 12B, and the third sub-pixel 13B. Specifically, the peaks of the spectra of light transmitted through the first color filter 20RG3, the second color filter 20BG3, and the third color filter 20R1, respectively, are set such that a combined color of the third red green RG3, the third blue green BG3, and the red R1 is the yellow Y. This configuration allows the yellow Y to be reproduced using the three sub-pixels 15 out of the four sub-pixels 15 of the single pixel 10B. Thus, the example allows the area of the sub-pixels 15 used for reproducing the yellow Y to be easily increased as compared with a case in which two colors (R and G) are used out of the sub-pixels of three colors of the conventional red (R), the conventional green (G), and the conventional blue (B). Specifically, the example illustrated in FIG. 14 allows a greater area of the color filter 20 and the reflective electrode 40 combining the area of the first sub-pixel 11B, the area of the second sub-pixel 12B, and the area of the third sub-pixel 13B out of a display area of the single pixel 10B to be easily allocated to the reproduction of the yellow Y, thereby reliably achieving the luminance and the saturation of the yellow Y. Further, the example also enhances the luminance and the saturation of cyan. Additionally, as compared with a configuration including a sub-pixel of white (W), the example allows the third sub-pixel 13B including the third color filter 20R1 corresponding to the red (R1) to be easily enlarged, thereby enhancing the reproducibility of primary colors.

The example allows the light transmission efficiency of the first color filter 20RG3 transmitting the light whose spectrum peak corresponds to the reddish green (e.g., third red green RG3) to be easily increased. Thus, the example uses the first sub-pixel 11B including the first color filter 20RG3 for the reproduction of the yellow Y, thereby more reliably achieving the luminance and the saturation of the yellow Y having higher luminous efficacy.

In the display device including the reflective electrode 40 like the display device 1 in the embodiment, a reflection factor and contrast of the light OL reflected by the reflective electrode 40 remain constant. Meanwhile, the visual quality of colors of an image output by the display device depends on the light source color and luminous intensity of the external light IL. Thus, when the external light IL is obtained under a bright environment, for example, the visual quality of colors of the image tends to be good. In contrast, when the external light IL is obtained under a dark environment, it is relatively difficult to exhibit reliable visibility. The color filter 20 does not completely transmit the external light IL regardless of the peak of the spectrum of the light to be transmitted, and absorbs at least part of the external light IL. Trying to darken the reproduced color using the color filter 20 increases a ratio of an absorbed part of the external light IL. Thus, the display device that outputs an image through the light OL is required to balance the saturation and the luminance by setting the peaks of the spectra of the light transmitted through the color filters 20 and adjusting an area ratio of the color filters 20 having different peaks. In other words, the display device that outputs the image through the light OL has an extreme difficulty in adjusting colors and luminance by adjusting the light source, which can be achieved by a display device having other configurations permitting selection and adjustments of the light source. According to the embodiment, even a display device having such a configuration can still reliably obtain the luminance and saturation of the yellow Y.

In the example illustrated in FIG. 14, the area ratio of the first color filter 20RG3, the second color filter 20BG3, the third color filter 20R1, and the fourth color filter 20B1, and the spectra of the third red green RG3, the third blue green BG3, the red R1, and the blue B1 are determined depending on the required white point W and the required luminance and the saturation of the yellow Y. The blue B1 in the embodiment and the conventional blue (B), which are identical to each other in FIG. 15, may be different from each other. The red R1 in the embodiment and the conventional red (R), which are identical to each other in FIG. 15, may be different from each other. Although the combination of the third red green RG3 and the third blue green BG3 reproduces the conventional green (G) in FIG. 15, the combination of the third red green RG3 and the third blue green BG3 may reproduce green that is different from the conventional green (G).

Figure 16:
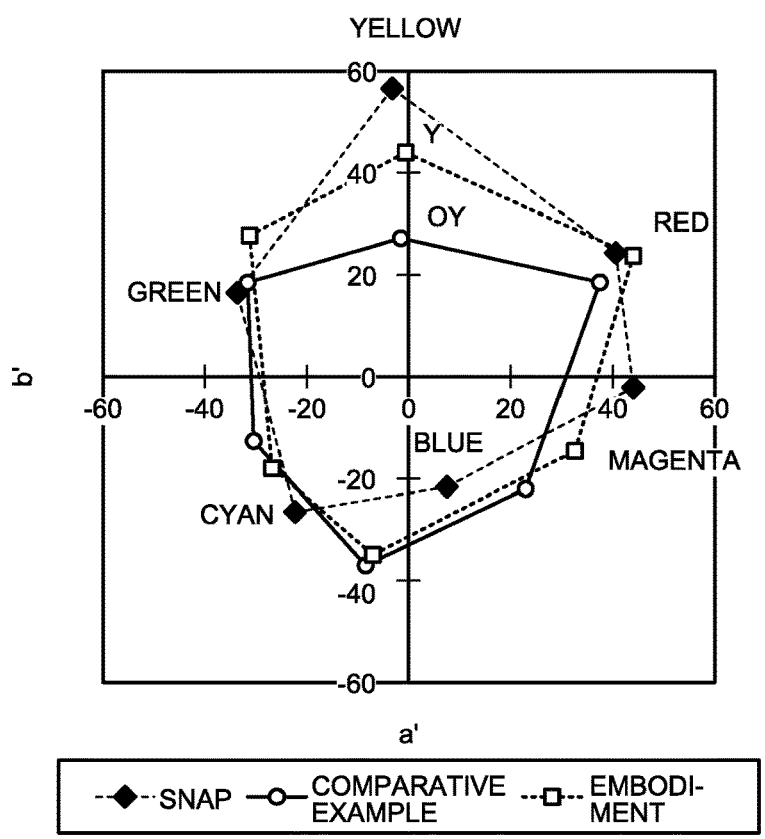
FIG. 16 is a chart indicating exemplary color reproducibility of the embodiment and that of a comparative example in an L*a*b* color space.

FIG. 16 is a chart indicating exemplary color reproducibility of the embodiment and that of a comparative example in an L*a*b* color space. In FIG. 16, SNAP indicates yellow, green, cyan, blue, magenta, and red specified by the Specifications for Newsprint Advertising Production. A display device in the comparative example is what is called an RGBW reflective display device that includes sub-pixels of four colors, i.e., white (W) in addition to the conventional red (R), the conventional green (G), and the conventional blue (B). The display device (e.g., display device 1) in the embodiment described with reference to FIGS. 1 to 15 can reproduce the yellow Y that is brighter and more vivid than yellow OY to be reproduced by the display device in the comparative example. The display device 1 can satisfy the demand in advertisement or the like by reproducing the bright and vivid yellow Y as required.

Figure 17:
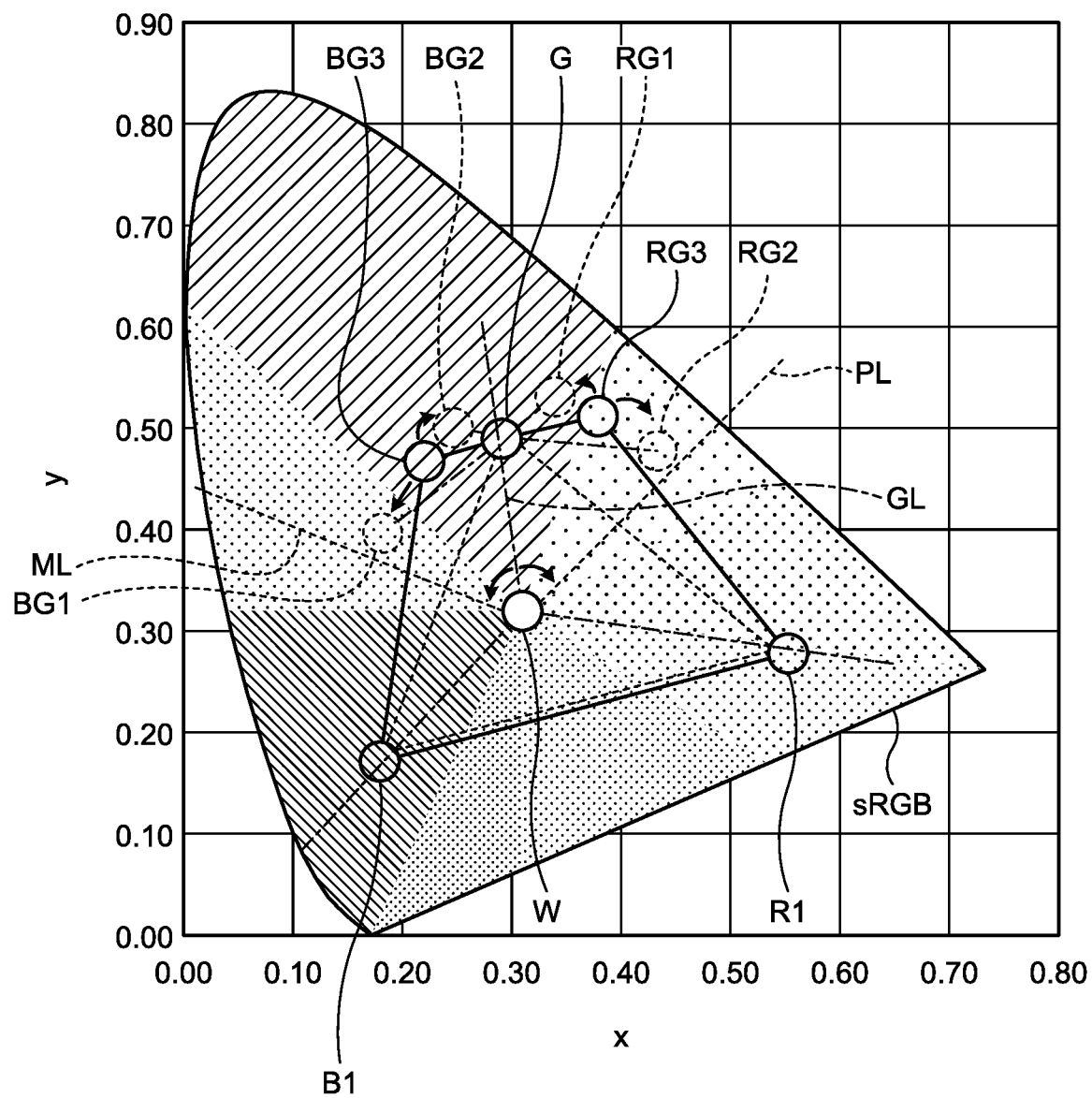
FIG. 17 is a schematic diagram illustrating, in an sRGB color space, a method for determining reddish green and bluish green according to an area ratio of the sub-pixels included in each of different types of a single pixel.

FIG. 17 is a schematic diagram illustrating, in an sRGB color space, a method for determining reddish green and bluish green according to the area ratio of the sub-pixels 15 included in each of the pixel 10, the pixel 10A, and the pixel 10B. FIG. 17 illustrates a dash-single-dot line GL that couples the green G, which is a combined color of the third red green RG3 and the third blue green BG3, with the white point W, while illustrating a broken line PL on the yellow side on which a hue angle is in the positive direction with respect to the dash-single-dot line GL. FIG. 17 illustrates a broken line ML on the cyan side on which the hue angle is in the negative direction with respect to the dash-single-dot line GL.

The area of the first sub-pixel 11A of the pixel 10A illustrated in FIG. 13 is smaller than the area of the first sub-pixel 11B of the pixel 10B illustrated in FIG. 14. The area of the second sub-pixel 12A of the pixel 10A illustrated in FIG. 13 is greater than the area of the second sub-pixel 12B of the pixel 10B illustrated in FIG. 14. When the characteristics of the color filters 20 of the first sub-pixel 11A and the second sub-pixel 12A are the same as those of the color filters 20 of the first sub-pixel 11B and the second sub-pixel 12B, a relation of color components and areas to be different between the pixel 10A and the pixel 10B. Specifically, in the pixel 10A, in comparison with the pixel 10B, the area allocated to a red component is decreased by a relative reduction amount of the area of the first sub-pixel 11A from that of the first sub-pixel 11B, and the area allocated to a blue component is increased by a relative increased amount of the area of the second sub-pixel 12A from that of the second sub-pixel 12B. As illustrated in FIG. 17, the hue angle of the second red green RG2 corresponding to the peak of the spectrum of the light transmitted through the first color filter 20RG2 included in the first sub-pixel 11A is on the positive side relative to the hue angle of the third red green RG3 corresponding to the peak of the spectrum of the light transmitted through the first color filter 20RG3 included in the first sub-pixel 11B. The hue angle of the second blue green BG2 corresponding to the peak of the spectrum of the light transmitted through the second color filter 20BG2 included in the second sub-pixel 12A is on the positive side relative to the hue angle of the third blue green BG3 corresponding to the peak of the spectrum of the light transmitted through the second color filter 20BG3 included in the second sub-pixel 12B. This configuration allows even the pixel 10A to achieve the required yellow Y and white point W, and green G equivalent to those in the pixel 10B.

The area of the third sub-pixel 13 of the pixel 10 illustrated in FIG. 2 is greater than the area of the third sub-pixel 13B of the pixel 10B illustrated in FIG. 14. The area of the fourth sub-pixel 14 of the pixel 10 illustrated in FIG. 2 is smaller than the area of the fourth sub-pixel 14B of the pixel 10B illustrated in FIG. 14. When the characteristics of the color filters 20 of the first sub-pixel 11 and the second sub-pixel 12 are the same as those of the color filters 20 of the first sub-pixel 11B and the second sub-pixel 12B, in the pixel 10, in comparison with the pixel 10B, the area allocated to a red component is increased by a relative increased amount of the area of the third sub-pixel 13, and the area allocated to a blue component is decreased by a relative decreased amount of the area of the fourth sub-pixel 14. As illustrated in FIG. 17, the hue angle of the first red green RG1 corresponding to the peak of the spectrum of the light transmitted through the first color filter 20RG1 included in the first sub-pixel 11 is on the negative side relative to the hue angle of the third red green RG3 corresponding to the peak of the spectrum of the light transmitted through the first color filter 20RG3 included in the first sub-pixel 11B. The hue angle of the first blue green BG1 corresponding to the peak of the spectrum of the light transmitted through the second color filter 20BG1 included in the second sub-pixel 12 is on the negative side relative to the hue angle of the third blue green BG3 corresponding to the peak of the spectrum of the light transmitted through the second color filter 20BG3 included in the second sub-pixel 12B.

This configuration allows even the pixel 10 to achieve the required yellow Y and white point W, and green G equivalent to those in the pixel 10B.

The first red green RG1, the second red green RG2, and the third red green RG3 have hue on the positive side with respect to the green G and on the negative side with respect to the red R1. The first blue green BG1, the second blue green BG2, and the third blue green BG3 have hue on the negative side with respect to the green G and on the positive side with respect to the blue B1.

As exemplified in FIGS. 2, 13, and 14, in the display device 1, the four sub-pixels 15 included in the single pixel 10, 10A, or 10B have two or more different types of areas. The sub-pixel 15 including a color filter 20 having a relatively high luminous efficacy has an area equal to or smaller than an area of the sub-pixel 15 including a color filter 20 having a relatively low luminous efficacy. Specifically, the first color filter 20RG1 has a luminous efficacy relatively higher than a luminous efficacy of the second color filter 20BG1. The first color filter 20RG2 has a luminous efficacy relatively higher than a luminous efficacy of the second color filter 20BG2. The first color filter 20RG3 has a luminous efficacy relatively higher than a luminous efficacy of the second color filter 20BG3.

Further, the first red green RG1, the second red green RG2, and the third red green RG3, and the first blue green BG1, the second blue green BG2, and the third blue green BG3 each have a luminous efficacy relatively higher than a luminous efficacy of the red R1. The red R1 has a luminous efficacy relatively higher than a luminous efficacy of the blue B1.

For the reproduction of yellow, the display device 1 in the embodiment uses three sub-pixels 15 excluding the fourth sub-pixel (e.g., fourth sub-pixel 14) that includes the fourth color filter 20B1. The sum of the areas of the three sub-pixels 15 used for reproducing the yellow Y may be equal to or greater than twice the area of the fourth sub-pixel. Alternatively, the three sub-pixels other than the fourth sub-pixel may be used to reproduce yellow regardless of the gradation value or the three sub-pixels other than the fourth sub-pixel may be used to reproduce yellow having a predetermined gradation value or higher. The yellow having the predetermined gradation value or higher refers to yellow having relatively high luminance and saturation as required, that is, yellow reproduced with halftone exceeding a predetermined gradation value. This configuration uses the first sub-pixel (e.g., first sub-pixel 11) and the third sub-pixel (e.g., third sub-pixel 13) to reproduce yellow with halftone having the predetermined gradation value or lower.

The two sub-pixels 15 having a relatively high luminance efficacy are adjacent to each other in the X-direction or the Y-direction. For example, in FIG. 2, the first sub-pixel 11 is adjacent to the second sub-pixel 12. In FIG. 13, the first sub-pixel 11A is adjacent to the second sub-pixel 12A. In FIG. 14, the first sub-pixel 11B is adjacent to the second sub-pixel 12B.

In the following description, the hue of the light OL transmitted through the color filter 20 included in one sub-pixel 15 is regarded as a reference. The two sub-pixels 15 disposed in juxtaposition to the one sub-pixel 15 transmit the light OL having a hue closer to the reference than the remaining one sub-pixel 15 does. The sub-pixels 15 are juxtaposed in the X-direction or the Y-direction. For example, in FIG. 2, the hue (first blue green BG1) of the second sub-pixel 12 and the hue (red R1) of the third sub-pixel 13 are closer to the hue (first red green RG1) of the first sub-pixel 11 than the hue (blue B1) of the fourth sub-pixel 14 disposed in a diagonal direction of the first sub-pixel 11 is. The hue (first blue green BG1) of the second sub-pixel 12 and the hue (red R1) of the third sub-pixel 13 are closer to the hue (blue B1) of the fourth sub-pixel 14 than the hue (first red green RG1) of the first sub-pixel 11 disposed in a diagonal direction of the fourth sub-pixel 14 is. Further, the hue (first red green RG1) of the first sub-pixel 11 and the hue (blue B1) of the fourth sub-pixel 14 are closer to the hue (first blue green BG1) of the second sub-pixel 12 than the hue (red R1) of the third sub-pixel 13 disposed in a diagonal direction of the second sub-pixel 12 is. The diagonal direction extends along the X-Y plane and intersects the X-direction and the Y-direction. The hue (first red green RG1) of the first sub-pixel 11 and the hue (blue B1) of the fourth sub-pixel 14 are closer to the hue (red R1) of the third sub-pixel 13 than the hue (first blue green BG1) of the second sub-pixel 12 disposed in a diagonal direction of the third sub-pixel 13 is. Relations of hues among the sub-pixels 15 illustrated in FIG. 13 can be described by reading the first sub-pixel 11, the second sub-pixel 12, the third sub-pixel 13, and the fourth sub-pixel 14 described with reference to FIG. 2 as the first sub-pixel 11A, the second sub-pixel 12A, the third sub-pixel 13A, and the fourth sub-pixel 14A, respectively. In such a pixel, the sub-pixels that are diagonally opposite to each other share no side. More specifically, the pixel is divided into four regions by one vertical line that divides the pixel laterally and one horizontal line that divides the pixel vertically. The vertical line is shifted toward the first sub-pixel (left edge side of the pixel) with respect to a centerline that laterally divides the pixel into half. The horizontal line is shifted toward the first sub-pixel (upper edge side of the pixel) with respect to a centerline that vertically divides the pixel into half. This configuration makes the magnitude relation of the areas of E<F≤G<H hold. Relations of hues among the sub-pixels 15 illustrated in FIG. 14 can be described by reading the first sub-pixel 11, the second sub-pixel 12, the third sub-pixel 13, and the fourth sub-pixel 14 described with reference to FIG. 2 as the first sub-pixel 11B, the second sub-pixel 12B, the third sub-pixel 13B, and the fourth sub-pixel 14B, respectively. In such a pixel, the sub-pixels that are diagonally opposite to each other share no side. More specifically, the pixel is divided into four regions by one vertical line that divides the pixel laterally and one horizontal line that divides the pixel vertically. The vertical line coincides with a centerline that laterally divides the pixel into half. The horizontal line is shifted toward the first sub-pixel (upper edge side of the pixel) with respect to a centerline that vertically divides the pixel into half. This configuration makes the magnitude relation of the areas of I=J<K=L hold.

The foregoing describes, with reference to FIGS. 2 and 13 to 17, the relation between the areas of the sub-pixels 15 and the peaks of spectra of colors transmitted through the color filter 20, while omitting the description of the sub-divided pixels 50. In the embodiment, however, the sub-pixels 15 illustrated in FIGS. 13 and 14 actually include a plurality of sub-divided pixels 50.

Figure 18:
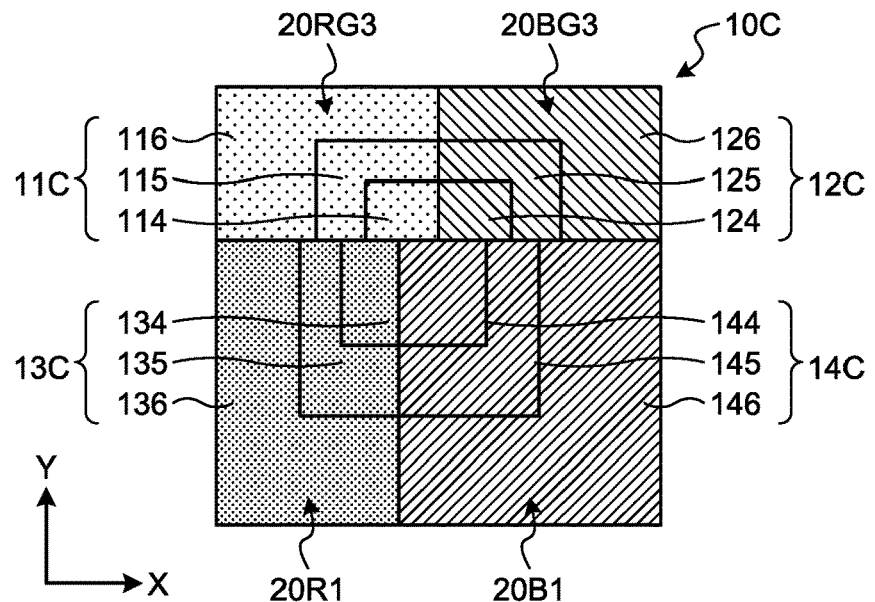
FIG. 18 is a diagram illustrating another example of dividing each sub-pixel into a plurality of regions having different areas for area coverage modulation.

FIG. 18 is a diagram illustrating another example of dividing each sub-pixel 15 illustrated in FIG. 14 into a plurality of regions having different areas for area coverage modulation. A pixel 10C includes a first sub-pixel 11C, a second sub-pixel 12C, a third sub-pixel 13C, and a fourth sub-pixel 14C. The first sub-pixel 11C including the first color filter 20RG3 includes a plurality of sub-divided pixels 50 such as a first sub-divided pixel 114, a second sub-divided pixel 115, and a third sub-divided pixel 116. The first sub-divided pixel 114, the second sub-divided pixel 115, and the third sub-divided pixel 116 have an area ratio of, for example, 1 to 2 to 4. The second sub-pixel 12C including the second color filter 20BG3 includes a first sub-divided pixel 124, a second sub-divided pixel 125, and a third sub-divided pixel 126. The third sub-pixel 13C including the third color filter 20R1 includes a first sub-divided pixel 134, a second sub-divided pixel 135, and a third sub-divided pixel 136. The fourth sub-pixel 14C including the fourth color filter 20B1 includes a first sub-divided pixel 144, a second sub-divided pixel 145, and a third sub-divided pixel 146. The first sub-pixel 11C, the second sub-pixel 12C, the third sub-pixel 13C, and the fourth sub-pixel 14C have an area ratio identical to an area ratio of the first sub-pixel 11B, the second sub-pixel 12B, the third sub-pixel 13B, and the fourth sub-pixel 14B. Though not illustrated, the sub-pixels 15 illustrated in FIG. 13 can also be configured to include a plurality of sub-divided pixels 50.

Figure 19:
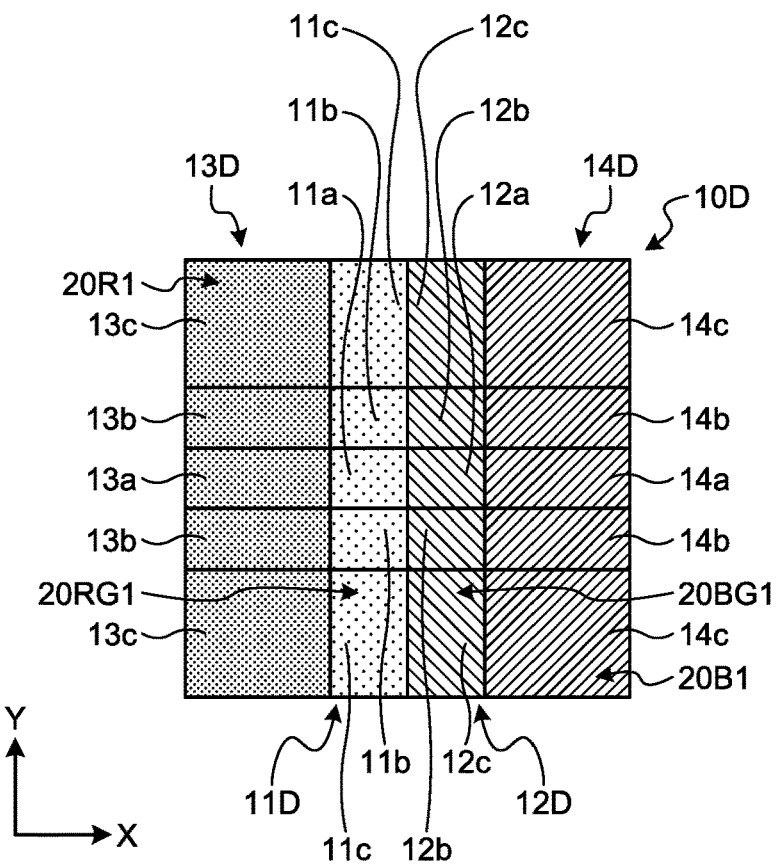
FIG. 19 is a diagram illustrating still another example of dividing each sub-pixel into a plurality of regions having different areas for area coverage modulation.

The shapes of the sub-pixels 15 and the positional relation among the sub-pixels 15 are not limited to those exemplified in FIGS. 2, 13, and 14. FIG. 19 is a diagram illustrating still another example of dividing each sub-pixel 15 into a plurality of regions having different areas for area coverage modulation. The shapes and arrangements of the sub-pixels 15 exemplified in FIGS. 2, 13, 14, and 18 are illustrative only and can be modified as appropriate. As illustrated in FIG. 19, for example, a pixel 10D includes the sub-pixels 15 including a third sub-pixel 13D, a first sub-pixel 11D, a second sub-pixel 12D, and a fourth sub-pixel 14D sequentially arranged from one end side in the X-direction. The sub-pixels 15 each have a stripe shape. These sub-pixels have widths in the X-direction, the relation of which is expressed as follows: the width of the first sub-pixel 11D=the width of the second sub-pixel 12D<the width of the third sub-pixel 13D=the width of the fourth sub-pixel 14D. The first sub-pixel 11D including the first color filter 20RG1 includes a plurality of sub-divided pixels 50 such as a first sub-divided pixel 11a, second sub-divided pixels 11b, and third sub-divided pixels 11c. An area ratio among the central first sub-divided pixel 11a, a pair of the upper and lower second sub-divided pixels 11b, and a pair of the upper and lower third sub-divided pixels 11c is, for example, 1 to 2 to 4. The first sub-pixel 11D has gradation performance of three bits (eight-step gradation) or higher through combinations of different states (the display state and the non-display state) of the first sub-divided pixel 11a, the second sub-divided pixels 11b, and the third sub-divided pixels 11c. The second sub-pixel 12D including the second color filter 20BG1 includes a plurality of sub-divided pixels 50 such as a first sub-divided pixel 12a, second sub-divided pixels 12b, and third sub-divided pixels 12c. The third sub-pixel 13D including the third color filter 20R1 includes a plurality of sub-divided pixels 50 such as a first sub-divided pixel 13a, second sub-divided pixels 13b, and third sub-divided pixels 13c. The fourth sub-pixel 14D including the fourth color filter 20B1 includes a plurality of sub-divided pixels 50 such as a first sub-divided pixel 14a, second sub-divided pixels 14b, and third sub-divided pixels 14c. The second sub-pixel 12D, the third sub-pixel 13D, and the fourth sub-pixel 14D each achieve the area coverage modulation through the same mechanism as that of the first sub-pixel 11D.

FIG. 19 illustrates a case in which an area ratio among the first sub-pixel 11D, the second sub-pixel 12D, the third sub-pixel 13D, and the fourth sub-pixel 14D is the same as that among the first sub-pixel 11, the second sub-pixel 12, the third sub-pixel 13, and the fourth sub-pixel 14 illustrated in FIG. 2. However, the present disclosure is not limited thereto. The area ratio of the stripe-shaped sub-pixels 15 as illustrated in FIG. 19 may be set to be identical to that of the sub-pixels 15 described with reference to FIG. 13 or FIG. 14. Further, in the stripe-shaped sub-pixels 15 as illustrated in FIG. 19, two sub-pixels 15 adjacent to one sub-pixel 15 that serves as a reference preferably have a hue closer to the hue of the reference sub-pixel 15 than the hue of the remaining one sub-pixel 15. In the example illustrated in FIG. 19, the one sub-pixel 15 that serves as the reference is the first sub-pixel 11D or the second sub-pixel 12D.

Figure 20:
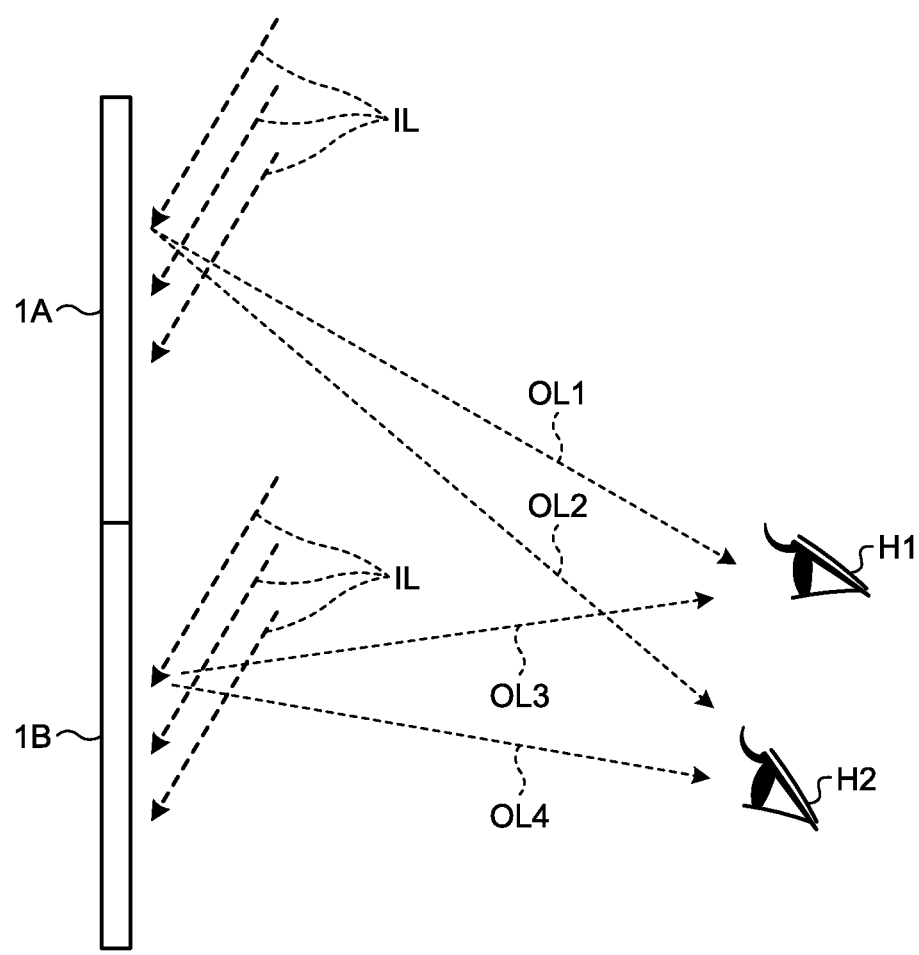
FIG. 20 is a diagram schematically illustrating an exemplary relation among external light, reflected light, and user's viewpoints when a plurality of display devices are disposed in juxtaposition.

FIG. 20 is a diagram schematically illustrating an exemplary relation among the external light IL, reflected light OL1, OL2, OL3, and OL4, and user's viewpoints H1 and H2 when a plurality of display devices 1A and 1B are disposed in juxtaposition. Each of the display devices 1A and 1B is the display device in the embodiment (e.g., display device 1). The reflected light OL1, OL2, OL3, and OL4 represent beams of light OL having exit angles different from each other. As illustrated in FIG. 20, when the display devices 1A and 1B are disposed in juxtaposition, for example, beams of light OL having different exit angles from the display devices 1A and 1B may be viewed even with an incident angle of incident light IL on the display device 1A being identical to an incident angle of incident light IL on the display device 1B. In this case, with respect to the user's viewpoint H1, the reflected light OL from the display device 1A is the reflected light OL1, and the reflected light OL from the display device 1B is the reflected light OL3. Which of the reflected light OL1 or the reflected light OL2 from the display device 1A is viewed by the user is changed depending on which of the user's viewpoint H1 or the user's view point H2 is assumed. Similarly, which of the reflected light OL3 or the reflected light OL4 from the display device 1B is viewed by the user is changed depending on which of the user's viewpoint H1 or the user's view point H2 is assumed. Consequently, the exit angle of the light OL viewed by the user may vary depending on conditions, such as how the display devices 1A and 1B are disposed, and where the user's viewpoint is. Thus, the display device 1A may be configured differently from the display device 1B without departing from the scope of the present disclosure. For example, either one of the display devices 1A and 1B may employ the area ratio of the four sub-pixels 15 as illustrated in any one of FIGS. 2, 13, and 14, and the other of the display devices 1A and 1B may employ the area ratio of the four sub-pixels 15 as illustrated in the other one of FIGS. 2, 13, and 14. Alternatively, the correspondence relation between the input (gradation values of R, G, and B) and (R1, RG, BG, and B1) in the LUT 115 of the display device 1A may be made different from the correspondence relation between the input (gradation values of R, G, and B) and (R1, RG, BG, and B1) in the LUT 115 of the display device 1B.

As described above, the embodiment can achieve even higher gradation performance by adding the halftone gradation display to the N-bit gradation display.

The embodiment can achieve the gradation display of a threefold gradation compared to the case of using only the N-bit gradation display by the halftone gradation display including the first combination and the second combination.

The embodiment can achieve the gradation display of a twofold gradation compared to the case of using only the N-bit gradation display by the halftone gradation display including the patterns that are switched between the first combination and the second combination at periodic intervals.

Using the halftone gradation display for the N-bit gradation display in a range of a predetermined gradation value or higher can further lower the possibility that a difference in color between the first combination and the second combination is visually recognized. Using the patterns that are switched between the first combination and the second combination can prevent relatively large fluctuation in luminance caused by switching between the display state and the non-display state of the largest sub-divided pixel 50 out of the sub-divided pixels 50. As a result, the embodiment can further lower the possibility that periodic fluctuation in luminance in the patterns that are switched between the first combination and the second combination is visually recognized.

In the reflective display device, the area of the third sub-pixel and the area of the fourth sub-pixel are each greater than the area of the first sub-pixel and the area of the second sub-pixel. The sum of the areas of the first sub-pixel and the second sub-pixel is equal to or greater than the area of the third sub-pixel and is equal to or greater than the area of the fourth sub-pixel. The first sub-pixel includes the third color filter that has a spectrum peak falling on the spectrum of reddish green. The second sub-pixel includes the fourth color filter that has a spectrum peak falling on the spectrum of bluish green. The third sub-pixel includes the first color filter that has a spectrum peak falling on the spectrum of red. The fourth sub-pixel includes the second color filter that has a spectrum peak falling on the spectrum of blue. The foregoing arrangement can further increase the luminance and saturation of yellow, thereby achieving the required luminance and saturation of yellow (e.g., yellow Y).

Making the area of the fourth sub-pixel greater than the area of the third sub-pixel allows the hue of the spectrum of light transmitted through the color filters included in the first sub-pixel and the second sub-pixel to be shifted to the more positive side. This configuration allows the luminous efficacy of the color filters included in the first sub-pixel and the second sub-pixel to be more easily increased. Accordingly, the configuration further increases the luminance and saturation of yellow, thereby reliably achieving the required luminance and saturation of yellow (e.g., yellow Y).

Making the area of the second sub-pixel greater than the area of the first sub-pixel allows the hue of the spectrum of light transmitted through the color filter included in the first sub-pixel to be shifted to the more positive side. This configuration allows the luminous efficacy of the color filter included in the first sub-pixel to be more easily increased. Accordingly, the configuration further increases the luminance and saturation of yellow, thereby reliably achieving the required luminance and saturation of yellow (e.g., yellow Y).

The first sub-pixel, the second sub-pixel, and the third sub-pixel in combination reproduce yellow. This configuration can allocate a greater area of color filters and reflective electrodes combining the first sub-pixel, the second sub-pixel, and the third sub-pixel out of the display area of a single pixel to the reproduction of yellow. Consequently, the configuration can reliably achieve the required luminance and saturation of yellow (e.g., yellow Y).

The first sub-pixel and the second sub-pixel in combination reproduce green. This configuration can allocate a greater area of color filters and reflective electrodes combining the first sub-pixel and the second sub-pixel out of the display area of a single pixel to the reproduction of green.

The first sub-pixel is adjacent to the second sub-pixel. This arrangement allows green to be reproduced more uniformly.

A display device operable with lower power consumption can be provided by the sub-divided pixels 50 performing the area coverage modulation The sub-divided pixels 50 each include a holder that holds a potential variable according to gradation display. This configuration allows the display device to further reduce power consumption.

The present disclosure can be applied to not only the reflective display device, but also a transmissive liquid crystal display device, an electrophoretic display device (E-paper), and a display device incorporating an organic light emitting diode (OLED).

The present disclosure can naturally provide other advantageous effects that are provided by the aspects described in the embodiments above and are clearly defined by the description in the present specification or appropriately conceivable by those skilled in the art.

What is claimed is:

1. A display device comprising:
a first sub-pixel;
a second sub-pixel;
a third sub-pixel; and
a fourth sub-pixel, wherein
each of the first sub-pixel, the second sub-pixel, the third sub-pixel, and the fourth sub-pixel is divided into N sub-divided pixels having different areas and is capable of N-bit gradation display through a combination of the N sub-divided pixels to be driven, where N is a natural number of 2 or greater,
gradation display for a mixed color that combines two types of sub-pixels out of the first sub-pixel, the second sub-pixel, the third sub-pixel, and the fourth sub-pixel includes the N-bit gradation display and halftone gradation display,
the N-bit gradation includes $2^N$-step gradation,
the halftone gradation display is gradation display between first gradation display and second gradation display,
in the first gradation display, an area ratio between the sub-divided pixels to be driven and the sub-divided pixels not to be driven in one of the two types of the sub-pixels is equal to an area ratio between the sub-divided pixels to be driven and the sub-divided pixels not to be driven in the other of the two types of the sub-pixels,
in the second gradation display, an area ratio between the sub-divided pixels to be driven and the sub-divided pixels not to be driven in one of the two types of the sub-pixels is equal to an area ratio between the sub-divided pixels to be driven and the sub-divided pixels not to be driven in the other of the two types of the sub-pixels, and a total area ratio of the sub-divided pixels to be driven to the sub-divided pixels not to be driven is greater than that in the first gradation display, and
in the halftone gradation display, an area ratio between the sub-divided pixels to be driven and the sub-divided pixels not to be driven is different between the two types of the sub-pixels.

2. The display device according to claim 1, wherein
the halftone gradation display uses at least two types of sub-pixels out of the sub-pixels, and is performed by a combination of the sub-divided pixels,
in the halftone gradation display, one of the at least two types of the sub-pixels corresponds to a u-step gradation, and the other of the at least two types of the sub-pixels corresponds to a (u+1)-step gradation, where u is a natural number that satisfies $0 \leq u \leq 2^N - 2$.

3. The display device according to claim 2, wherein
the halftone gradation display includes:
a first combination in which, out of the at least two types of the sub-pixels, a sub-pixel including a relatively bright color filter corresponds to the u-step gradation and, out of the at least two types of the sub-pixels, a sub-pixel including a relatively dark color filter corresponds to the (u+1)-step gradation; and
a second combination in which, out of the at least two types of the sub-pixels, a sub-pixel including a relatively dark color filter corresponds to the u-step gradation and, out of the at least two types of the sub-pixels, a sub-pixel including a relatively bright color filter corresponds to the (u+1)-step gradation.

4. The display device according to claim 2, wherein
the halftone gradation display includes patterns that are switched between a first combination and a second combination at periodic intervals,
the first combination is a combination in which, out of the at least two types of the sub-pixels, a sub-pixel including a relatively bright color filter corresponds to the u-step gradation and, out of the at least two types of the sub-pixels, a sub-pixel including a relatively dark color filter corresponds to the (u+1)-step gradation, and
the second combination is a combination in which, out of the at least two types of the sub-pixels, a sub-pixel including a relatively dark color filter corresponds to the u-step gradation and, out of the at least two types of sub-pixels, a sub-pixel including a relatively bright color filter corresponds to the (u+1)-step gradation.

5. The display device according to claim 1, wherein the halftone gradation display is used for the N-bit gradation display in a range of a predetermined gradation value or higher.

6. The display device according to claim 1, wherein
the first sub-pixel includes a first color filter that transmits light having a spectrum peak falling on a spectrum of reddish green,
the second sub-pixel includes a second color filter that transmits light having a spectrum peak falling on a spectrum of bluish green,
the third sub-pixel includes a third color filter that transmits light having a spectrum peak falling on a spectrum of red, and
the fourth sub-pixel includes a fourth color filter that transmits light having a spectrum peak falling on a spectrum of blue.

7. The display device according to claim 6, wherein
an area of the third sub-pixel and an area of the fourth sub-pixel are each greater than an area of the first sub-pixel and an area of the second sub-pixel, and
a sum of the areas of the first sub-pixel and the second sub-pixel is equal to or greater than the area of the third sub-pixel.

8. The display device according to claim 7, wherein the sum of the areas of the first sub-pixel and the second sub-pixel is equal to or greater than the area of the fourth sub-pixel.

9. The display device according to claim 6, wherein an area of the fourth sub-pixel is greater than an area of the third sub-pixel.

10. The display device according to claim 9, wherein an area of the second sub-pixel is greater than an area of the first sub-pixel.

11. The display device according to claim 6, wherein the first sub-pixel, the second sub-pixel, and the third sub-pixel in combination reproduce yellow.

12. The display device according to claim 6, wherein the first sub-pixel and the second sub-pixel in combination reproduce green.

13. The display device according to claim 6, wherein the first sub-pixel is adjacent to the second sub-pixel.

14. The display device according to claim 1, wherein the first sub-pixel, the second sub-pixel, the third sub-pixel, and the fourth sub-pixel each include at least one of reflective electrodes that reflect light transmitted through a corresponding color filter.

15. The display device according to claim 14, further comprising:
a first substrate provided with the reflective electrodes;
a second substrate provided with the color filter and a translucent electrode; and
a liquid crystal layer disposed between the reflective electrodes and the translucent electrode, wherein
each of the sub-divided pixels is provided with one or two of the reflective electrodes.

* * * * *